(12) United States Patent
Kuwata et al.

(10) Patent No.: US 7,677,738 B2
(45) Date of Patent: Mar. 16, 2010

(54) IMAGE PROJECTOR

(75) Inventors: Muneharu Kuwata, Tokyo (JP);
Tomohiro Sasagawa, Tokyo (JP);
Kuniko Kojima, Tokyo (JP); Akihiro Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 811 days.

(21) Appl. No.: 11/587,699

(22) PCT Filed: Apr. 6, 2005

(86) PCT No.: PCT/JP2005/006757

§ 371 (c)(1),
(2), (4) Date: Oct. 26, 2006

(87) PCT Pub. No.: WO2005/106560

PCT Pub. Date: Nov. 10, 2005

(65) Prior Publication Data

US 2007/0229779 A1   Oct. 4, 2007

(30) Foreign Application Priority Data

Apr. 27, 2004   (JP)   ............... 2004-130862

(51) Int. Cl.
G03B 21/28   (2006.01)
G02B 3/00   (2006.01)
G02B 9/00   (2006.01)

(52) U.S. Cl. ............... 353/78; 353/77; 359/749
(58) Field of Classification Search ............ 353/77, 353/78, 98, 99, 100; 359/649, 650, 651
See application file for complete search history.

(56) References Cited

U.S. PATENT DOCUMENTS

| | | | |
|---|---|---|---|
| 5,274,406 A | 12/1993 | Tejima et al. | |
| 5,648,871 A | 7/1997 | Okuyama et al. | |
| 6,631,994 B2 | 10/2003 | Suzuki et al. | |
| 6,690,517 B2 * | 2/2004 | Ohzawa et al. | 359/649 |
| 6,726,859 B2 | 4/2004 | Sekiguchi et al. | |
| 6,761,458 B2 * | 7/2004 | Sakata et al. | 353/78 |
| 6,771,427 B1 | 8/2004 | Matsuo | |
| 2001/0050758 A1 | 12/2001 | Suzuki et al. | |
| 2003/0133082 A1 | 7/2003 | Sunaga | |
| 2005/0134807 A1 * | 6/2005 | Lee | 353/77 |

FOREIGN PATENT DOCUMENTS

| | | |
|---|---|---|
| JP | 1-257834 A | 10/1989 |
| JP | 3-186831 A | 8/1991 |
| JP | 5-134213 A | 5/1993 |
| JP | 2001-264634 A | 9/2001 |
| JP | 2002-207168 A | 7/2002 |
| JP | 2003-75767 A | 3/2003 |
| WO | WO-01/06295 A1 | 1/2001 |
| WO | WO-02/27399 A1 | 4/2002 |

* cited by examiner

*Primary Examiner*—Georgia Y Epps
*Assistant Examiner*—Ryan Howard
(74) *Attorney, Agent, or Firm*—Birch, Stewart, Kolasch & Birch, LLP

(57) ABSTRACT

According to the present invention, an image projector includes a reflecting light valve, a group of refracting lenses forming a projecting optical system that enlarges and projects an optical image given from the light valve, a power mirror having a power and forming the projecting optical system together with the group of refracting lenses, and a transmissive screen for displaying the optical image that is given from the light valve and enlarged by the projecting optical system, wherein the exit pupil position is set such that the minimum angle of view θmin exceeds 40°, and the Petzval partial sum of lenses is set larger than a value determined by the minimum angle of view.

12 Claims, 25 Drawing Sheets

F I G. 1
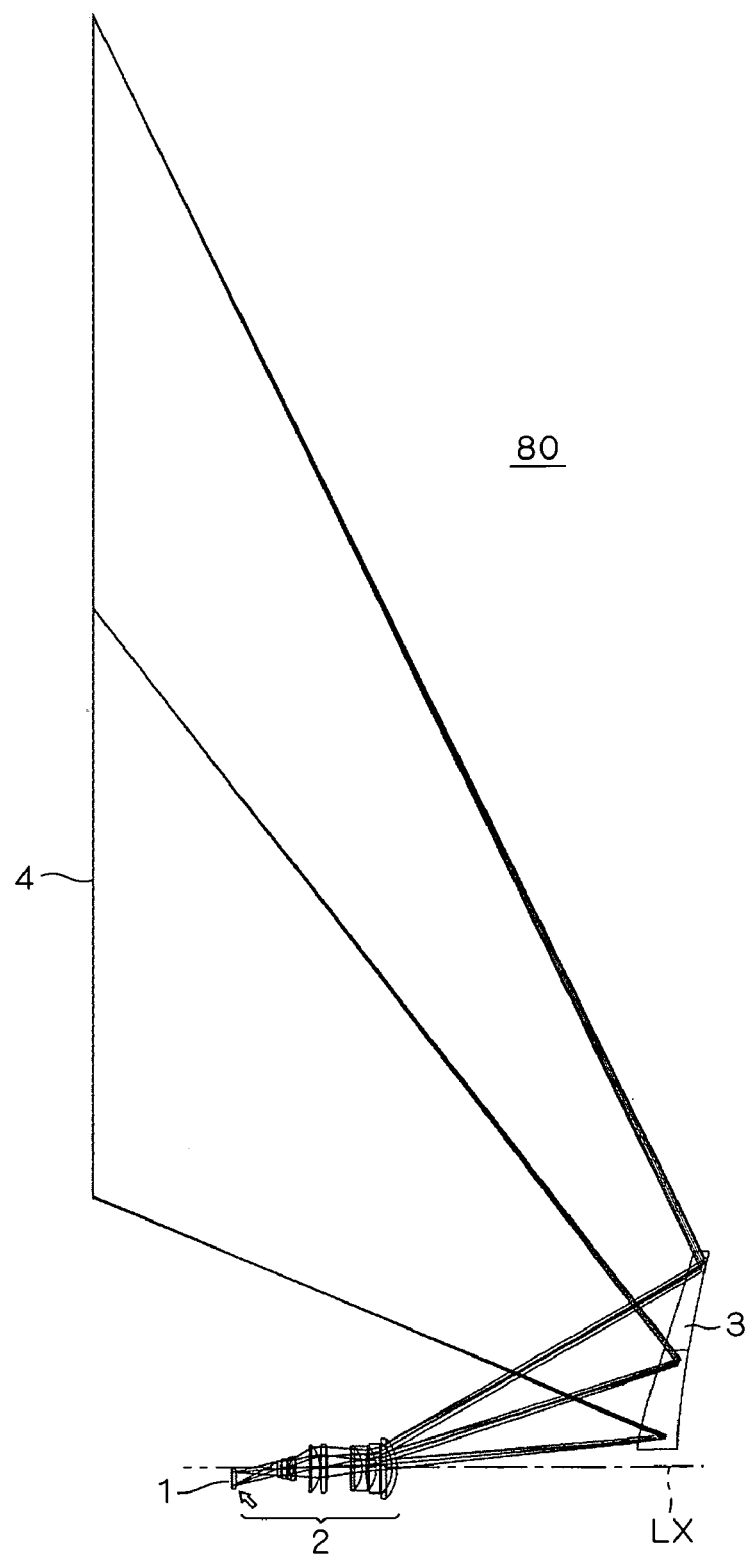

F I G . 2 5
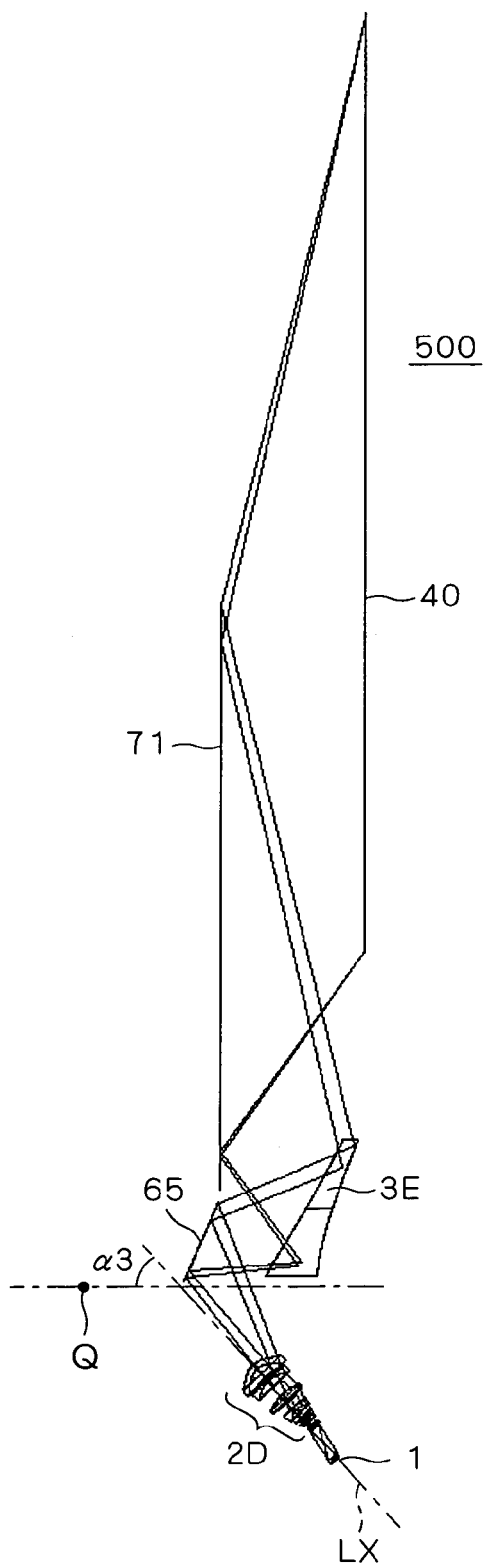

F I G . 2 6
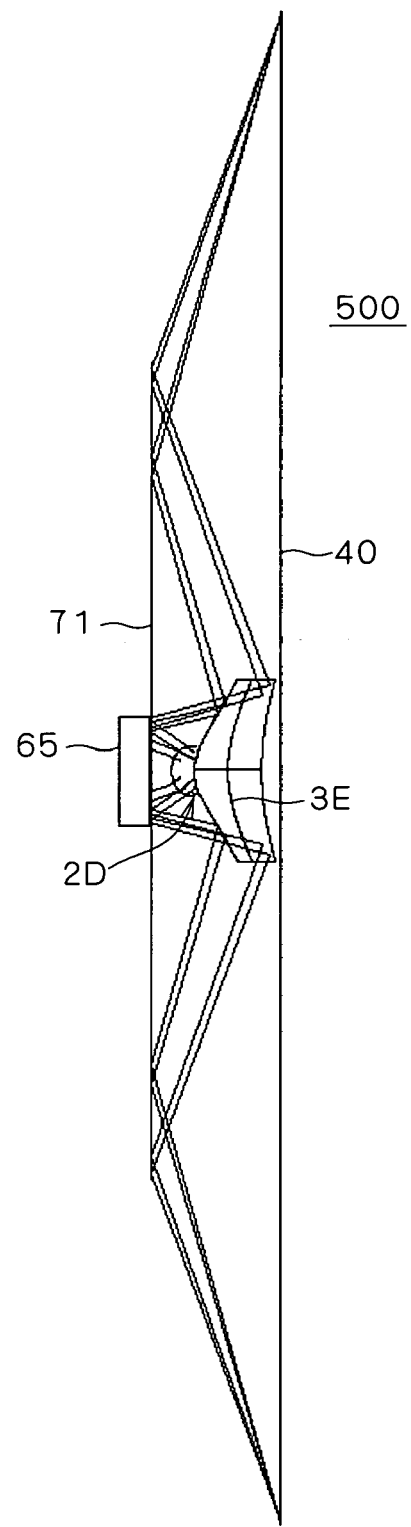

F I G . 2 7
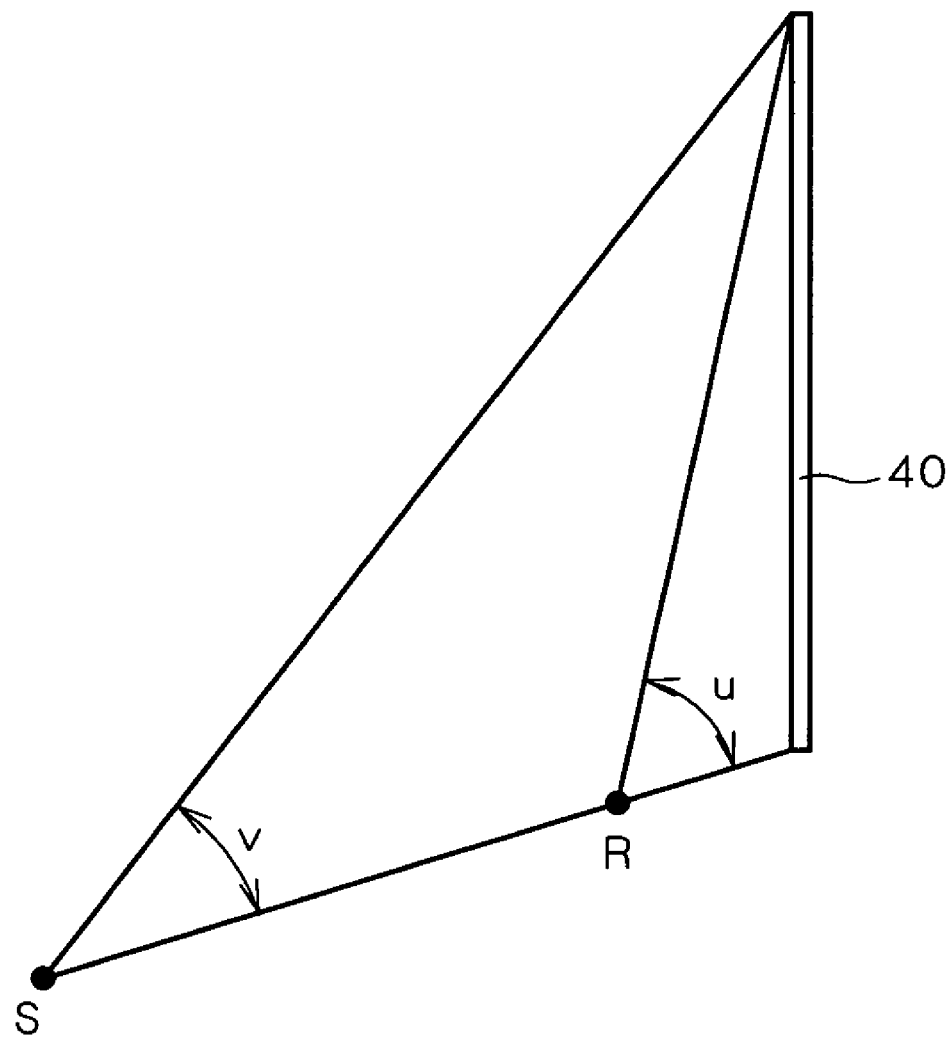

IMAGE PROJECTOR

TECHNICAL FIELD

The present invention relates to an image projector that projects an image onto a transmissive screen, and particularly to an image projector that enlarges and obliquely projects an image given from a reflecting light valve onto the screen.

BACKGROUND ART

A conventional image projector is constructed such that the principal ray in the center of the screen impinges upon the screen approximately perpendicularly thereto, and it can be sized thinner by reducing the depth dimension or the dimension perpendicular to the screen. Accordingly, a rear mirror having no power is provided behind the screen, and the projected light is once reflected at the rear mirror and then projected onto the screen.

With such a configuration, the image projector may be sized still thinner by using a wider-angle optical system or by placing the rear mirror closer to the screen in parallel thereto, but these approaches are not successful because they cause interference between the projecting optical system and the projected light.

In a structure proposed to solve this problem, a still thinner image projector is realized by using an off-axis projecting optical system with a wider angle and shorter focus, while avoiding interference in the projecting optical path.

As compared with central-projection image projectors, this structure requires a projecting optical system with an extremely large angle of projection view, and it is advantageous to use reflecting mirrors causing no chromatic aberration, in order to reduce chromatic aberration caused by the wider angle. Accordingly, optical systems formed only of a plurality of reflecting mirrors are proposed, and optical systems formed of a group of refracting lenses and a reflecting mirror having a power are also proposed, as described in Patent Document 1 and Patent Document 2, for example.

Also, when a refracting Fresnel lens is used to form the screen, the screen exhibits deteriorated light transmittance in regions of larger angle of projection view, while using a total-reflecting Fresnel lens to form the screen results in deteriorated light transmittance in regions of smaller angle of projection view. Accordingly, a method is proposed which uses a hybrid structure having both of refracting and total-reflecting portions, in order to ensure appropriate light transmittance of the screen, as shown in Patent Document 3, for example.

Patent Document 1: Japanese Patent Application Laid-Open No. 2002-207168 (FIG. 39)

Patent Document 2: International Publication WO 01/06295 (FIG. 20)

Patent Document 3: International Publication WO 02/27399 (FIG. 7)

When only a plurality of reflecting mirrors are used to realize a thinner image projector, it is difficult, since mirrors are reflecting components, to arrange the plurality of mirrors without causing interference in the optical path, and then the optical path must be bent complicatedly.

Also, mirrors are more sensitive than refracting lenses to positional and angular displacements, and therefore a complicated configuration is required to highly precisely position all of the plurality of mirrors.

Furthermore, in a structure using both of a group of refracting lenses and a mirror, realizing a wider angle with large negative power of the mirror requires that the group of refracting lenses be configured complicatedly in order to correct large curvature of field caused by the mirror.

DISCLOSURE OF THE INVENTION

The present invention has been made to solve the problems above, and an object of the present invention is to provide an image projector with a large angle of projection view and good image projecting performance, without requiring complicatedly configuring the lens structure and mechanism of its projecting optical system.

An image projector according to claim 1 of the invention comprises: a reflecting light valve that displays an optical image; a projecting optical system that enlarges and projects said optical image given from said light valve; and a screen onto which said optical image enlarged by said projecting optical system is projected, wherein said projecting optical system comprises: a group of refracting lenses that receives and enlarges light from said light valve; and a power mirror that has a power and that receives and enlarges and reflects light from said group of refracting lenses, wherein a display surface of said light valve and a screen surface of said screen are disposed perpendicular to an optical axis, and wherein, when a minimum value of an angle formed between a normal to said screen surface and principal rays incident upon said screen is a minimum angle of view $\theta$min, and, about said group of refracting lenses, a radius of curvature of an ith surface is $r_i$, a refractive index of said ith surface is $n_i$, a refractive index of an (i+1)th surface is $n_{i+1}$, and the total number of lens surfaces is N, and a sum of Petzval components of the surfaces of the plurality of lenses of said group of refracting lenses is a Petzval partial sum of the lenses, PL, and $PL=\Sigma\{-1/r_i \times (1/n_{i+1}-1/n_i)\}$ [i=1, ..., N] ... (1), then, in said projecting optical system, the exit pupil position (Q) is set such that said minimum angle of view $\theta$min exceeds 40°, and a relation of $PL>0.0007\times\theta min-0.026$ ... (4) is satisfied.

According to the image projector of claim 1 of the invention, the exit pupil position of the projecting optical system is set so that the minimum angle of view $\theta$min exceeds 40°, which eliminates a need for a configuration for reducing the Petzval partial sum of lenses. Also, the Petzval partial sum of lenses, PL, is set larger than a value determined by the right side of Expression (4), so that the lens structure can be simplified and the lens system exhibits reduced sensitivity to decentering, whereby the burden of optical designing is reduced and a high-performance image projector with a simple structure is provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A diagram showing the configuration and optical path of an image projector according to a first experimental example produced in the process through which the present invention was achieved.

FIG. 25 A diagram showing the configuration and optical path of an image projector according to a fifth preferred embodiment of the present invention.

FIG. 26 A diagram showing the configuration and optical path of the image projector of the fifth preferred embodiment of the invention.

FIG. 27 A diagram used to describe that the value of Petzval partial sum of lenses is varied when the exit pupil position is varied.

BEST MODE FOR CARRYING OUT THE INVENTION

Figure 2:
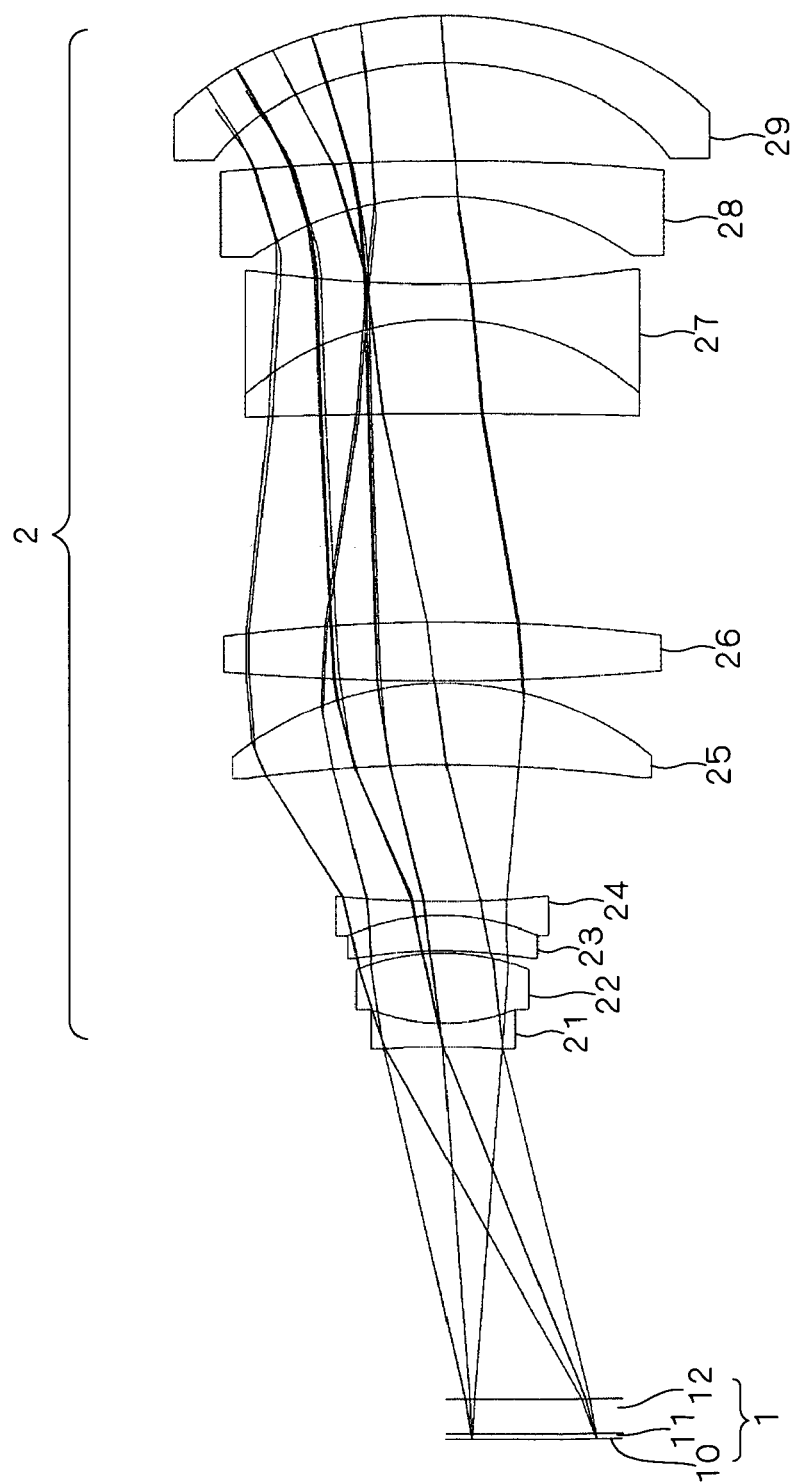
FIG. 2 A diagram showing the configuration of the lens system of the image projector of the first experimental example produced in the process of achieving the invention.

Process Through which the Invention was Achieved

First, the process through which the present invention was achieved will be described prior to the description of the preferred embodiments of the invention.

First Experimental Example

First, in order to clarify problems of conventional image projectors, the inventors made and examined an image projector 80 shown below as a first experimental example.

FIG. 1 shows the configuration and optical path of the image projector 80.

As shown in FIG. 1, the image projector 80 includes a reflecting light valve 1, a group of refracting lenses 2 forming a projecting optical system for enlarging and projecting an optical image given from the light valve 1, a power mirror 3 having a power and forming the projecting optical system together with the group of refracting lenses 2, and a transmissive screen 4 for displaying the optical image that is given from the light valve 1 and enlarged by the projecting optical system. The center of the light valve 1 is offset vertically downward from the optical axis LX of the projecting optical system.

The light valve 1 is formed of a digital micro-mirror device (DMD: a registered trademark of Texas Instruments Incorporated (TI)) that includes a plurality of tiny mirrors capable of individually changing angles, and it receives illumination light from an illumination optical system not shown (the direction of incidence is shown with the arrow) and spatially intensity-modulates and reflects the light according to the angles of the mirrors, so as to produce an optical image.

In the DMD, micro-mirrors in ON state reflect the illumination light toward the entrance pupil of the projecting optical system, and the reflected light enters the group of refracting lenses 2 of the projecting optical system and is repeatedly refracted and transmitted, and it is then reflected at the power mirror 3 onto the screen 4 to form an image on the screen 4. Light reflected at micro-mirrors in OFF state does not enter the projecting optical system and does not contribute to the image formation.

The present invention is applicable not only to DMDs but also to other types of spatial light modulators, but the description below is made assuming that a DMD is used.

FIG. 2 shows the configuration of the group of refracting lenses 2. The group of refracting lenses 2 is formed of a combination of nine lenses, from a lens 21 placed closest to the light valve 1 to a lens 29 placed most distant from the light valve 1. The light valve 1 has a glass plate 12 protecting the surface of a mirror 10, and an air layer 11 exists between the surface of the mirror 10 and the glass plate 12.

The range of angle of projection view of the image projector 80 is 23.4° to 67.4°. In general, correcting the curvature of field becomes more difficult as the angle of view is enlarged. The curvature of field is a phenomenon in which a flat object surface is imaged on a curved surface rather than a plane. According to aberration theory, in the region of third-order aberration, the image surface of a flat object is a spherical surface and proportional to the square of the image height. The field curvature is represented with the radius of curvature of the spherical surface or its reciprocal, curvature, and a larger value of curvature means larger field curvature.

Petzval sum is used as an index of the curvature of the image surface, where a larger value of Petzval sum means larger distortion of the image surface. Accordingly, correcting the field curvature requires setting the Petzval sum closer to zero (to make the absolute value small).

The Petzval sum P1 is given by Expression (1) below.

$$P1 = \Sigma p_i = \Sigma\{-1/r_i \times (1/n_{i+1} - 1/n_i)\} \quad [i=1,\ldots,N] \quad (1)$$

Where,
$p_i$: Petzval component of the ith surface,
$r_i$: radius of curvature of the ith surface,
$n_i$: refractive index of the ith surface,
$n_{i+1}$: refractive index of the (i+1)th surface, and
N: the total number of surfaces.

When all lenses are assumed to be thin lenses, the Petzval sum P2 is given by Expression (2) below.

$$P2 = \Sigma(\phi_k/n_k) \quad [k=1,\ldots,M] \quad (2)$$

Where,
$\phi_k$: power of the kth lens,
$n_k$: refractive index of the kth lens, and
M: the total number of lenses.

As can be seen from Expression (2), in order to make the Petzval sum smaller when P2>0, it is advantageous to make the refractive index larger and the power smaller with a positive lens, and to make the refractive index smaller and the power larger with a negative lens.

In general, when the height of a light ray at a surface is h and the power of the surface is $\phi$, then the angle of refraction of the light ray is proportional to $h \cdot \phi$. Accordingly, when the angle of refraction of the light ray is fixed, it is more effective to place a positive lens having a smaller power $\phi$ and a larger refractive index in a position where the height of the light ray, h, is larger, and to place a negative lens having a larger power $\phi$ and a smaller refractive index in a position where the height of the light ray, h, is smaller.

In the image projector 80 shown in FIG. 1, the power mirror 3 has a negative power and the sign of the mirror's $p_i$ (Petzval) is calculated to be positive. Accordingly, it is desirable that the Petzval partial sum of the group of lenses have a negative sign so as to cancel the positive $p_i$ value of the mirror, in order to obtain a smaller absolute value of the Petzval sum of the entire projecting optical system including the group of lenses. When the sign of the Petzval partial sum of the group of lenses is positive, it is desirable to make its absolute value as small as possible.

Now, in the Petzval sum of the entire projecting optical system, the total of the Petzval components ($p_i$) of the lens surfaces, excluding that of the mirror, is defined as a Petzval partial sum of lenses, and it is expressed as PL so that it can be distinguished from the Petzval sum P1 of the entire projecting optical system. The Petzval partial sum PL of lenses is also obtained on the basis of Expression (1) or Expression (2).

In the image projector 80, the sign of the Petzval partial sum of the lenses is made negative to cancel the mirror's positive $p_i$ value so as to correct the curvature of field, and Tables 1 and 2 below show an example of optical data for the image projector 80.

In Table 1, "Surf" indicates numbers of surfaces, S1 to S20, that are assigned sequentially to the surfaces of the components, with the surface of the mirror 10 of the light valve 1 (FIG. 2) shown as OBJ and the surface of the power mirror 3 shown as S20, and R is the radius of curvature (mm) of each component, d is surface separation (mm), nd is refractive index of d-ray (waveform 587.6 nm), and vd is Abbe constant. The surface number S3 corresponds to the plane of incidence of the lens 21, and is indicated as a diaphragm because the lens 21 is a diaphragm lens, and the mirror surface of the power mirror 3 is indicated as Mirror. A minus (−) sign attached to numerical value of surface separation indicates that the surface is a reflecting surface.

The marks * added to surface numbers indicate aspherical surfaces, and Expression (3) below is an expression that defines aspherical form in terms of the amount of sag Z(R) at a position separated by a radius R from the optical axis.

$$Z(R) = cR^2/[1+\{1-(1+k)c^2R^2\}^{1/2}] + \Sigma A_i R^i \quad [i=1,\ldots] \quad (3)$$

Where,
c: curvature at the surface vertex,
k: conic coefficient, and
$A_i$: ith-order aspheric coefficient.

TABLE 1

| Surf | R | d | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* (DIAPHRAGM) | −102.091 | 2.00 | 1.68893 | 31.08 |
| S4 | 14.357 | 6.00 | 1.75500 | 52.32 |
| S5 | −17.752 | 0.20 | | |
| S6 | −39.327 | 3.00 | 1.60729 | 59.47 |
| S7 | −17.467 | 1.20 | 1.84666 | 23.83 |
| S8 | 74.545 | 11.60 | | |
| S9 | −106.744 | 7.00 | 1.80518 | 25.46 |
| S10 | −24.623 | 0.20 | | |
| S11 | 183.080 | 5.00 | 1.80518 | 25.46 |
| S12 | −124.559 | 17.70 | | |
| S13 | −474.771 | 8.00 | 1.78800 | 47.49 |
| S14 | −22.114 | 3.00 | 1.75520 | 27.53 |
| S15 | 94.539 | 7.50 | | |
| S16 | −24.334 | 3.00 | 1.75520 | 27.53 |
| S17 | −169.812 | 8.30 | | |
| S18* | −27.249 | 4.00 | 1.52996 | 55.80 |
| S19* | −31.677 | 177.00 | | |
| S20* | 105.608 | −400.00 | Mirror | |

Table 2 shows the conic coefficients and aspheric coefficients of the aspherical surfaces S3, S18, S19 and S20.

TABLE 2

| S3 | |
|---|---|
| k | 0 |
| A4 | −7.7180120E−05 |
| A6 | −1.9565826E−08 |
| A8 | −9.9710159E−09 |
| A10 | 1.2966464E−10 |
| S18 | |
| k | 0.7835027 |
| A4 | 5.7598701E−06 |
| A6 | −2.6035317E−08 |
| A8 | 1.8005152E−11 |
| A10 | −6.3599620E−14 |
| S19 | |
| k | −0.05544459 |
| A4 | 5.4639677E−06 |
| A6 | −1.6012979E−08 |
| A8 | −2.1524119E−12 |
| A10 | 1.7827152E−15 |
| S20 | |
| k | −6.92079 |

TABLE 2-continued

| A4 | −1.4217533E−08 |
|---|---|
| A6 | 4.2395127E−13 |
| A8 | −7.2421134E−18 |
| A10 | 5.2788429E−23 |

Figure 3:
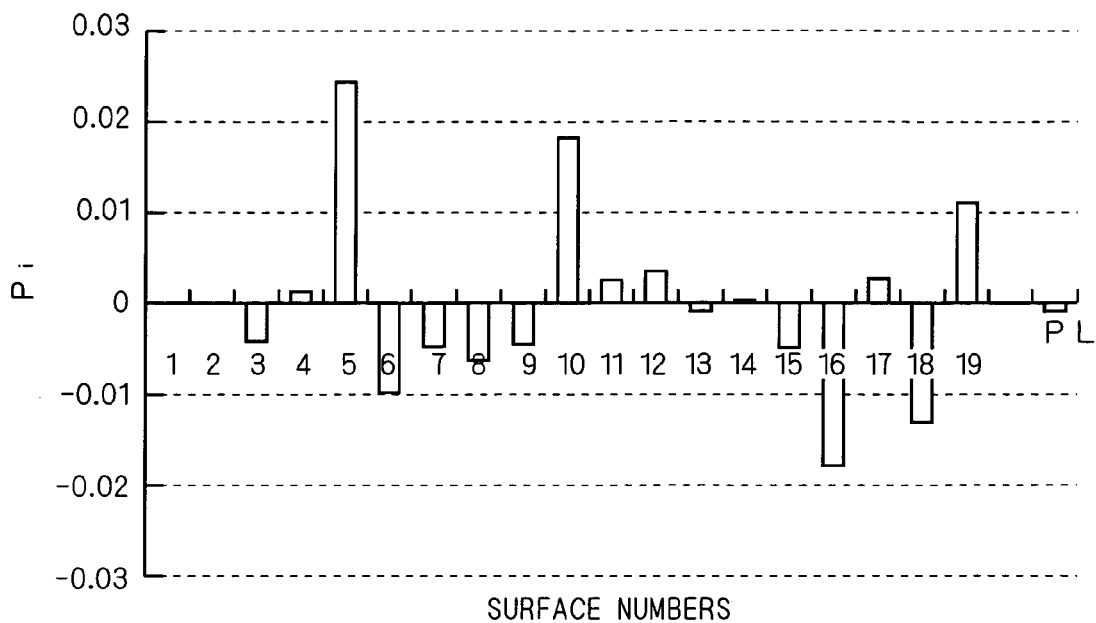
FIG. 3 A diagram showing values of $p_i$ of individual lens surfaces of the image projector of the first experimental example produced in the process of achieving the invention.

Next, FIG. 3 is a bar graph showing the values of $p_i$ of the individual lens surfaces.

In FIG. 3, the horizontal axis shows the surface numbers (without letter S) and the vertical axis shows the values of $p_i$ of the individual lens surfaces. FIG. 3 also shows the Petzval partial sum PL of the lenses, and PL of the first experimental example is −0.00056. This value of PL was calculated on the basis of Expression (1), and the values of Petzval partial sum PL of lenses shown in the description below were also obtained on the basis of Expression (1).

FIG. 3 shows that the sign of the Petzval partial sum PL of the lenses is negative and it works to cancel the positive value of $p_i$ of the power mirror 3 (FIG. 1), so that the Petzval sum of the entire projecting optical system is small.

Careful examination of the values of $p_i$ of the surfaces of the first experimental example shows that, at the sixth to eighth surfaces and the sixteenth and eighteenth surfaces, large negative powers are placed in positions where the height of marginal light rays is small (the distance from the optical axis to light rays passing near the outer edge of the diaphragm), so as to produce large negative values of $p_i$.

Also, at the eleventh and twelfth surfaces, small positive powers are placed in positions where the height of marginal light rays is large, so as to make the positive values of $p_i$ smaller.

With these effects, the Petzval partial sum PL of the lenses of the first experimental example is small and the curvature of filed is corrected.

However, as can be seen from FIG. 2, achieving the correction requires a complicated configuration of lenses, and positional shifts of the individual components will exert considerable influence on the performance. To explain this, FIG. 4 shows variations of spot RMS (Root Mean Square) radius exhibited when the lens surfaces are decentered.

Figure 4:
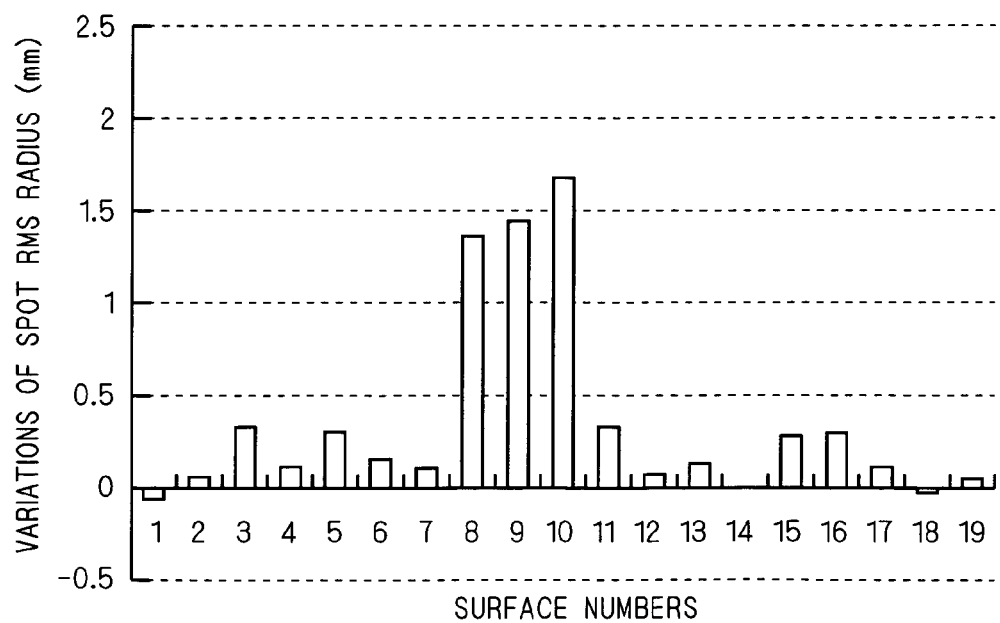
FIG. 4 A diagram showing variations of spot RMS radius exhibited when the lens surfaces are decentered in the image projector of the first experimental example produced in the process of achieving the invention.

In FIG. 4, the horizontal axis shows the surface numbers (without letter S) and the vertical axis shows the variations (mm) of spot RMS radius exhibited when the lens surfaces are tilted 0.05° vertically downward around the surface vertexes.

To express the variations of spot RMS radius, a lateral half of the screen is divided into lattice sections of vertical×horizontal: 3×2, and the means of values at the 12 lattice points were used.

From FIG. 4, in the first experimental example, the variations are large particularly at the eighth surface that greatly diverges light rays and at the ninth and tenth surfaces where the height of marginal light rays is large. That is, the sensitivity to decentering is made large by adopting a lens configuration that provides a smaller value of Petzval partial sum of lenses.

Figure 5:
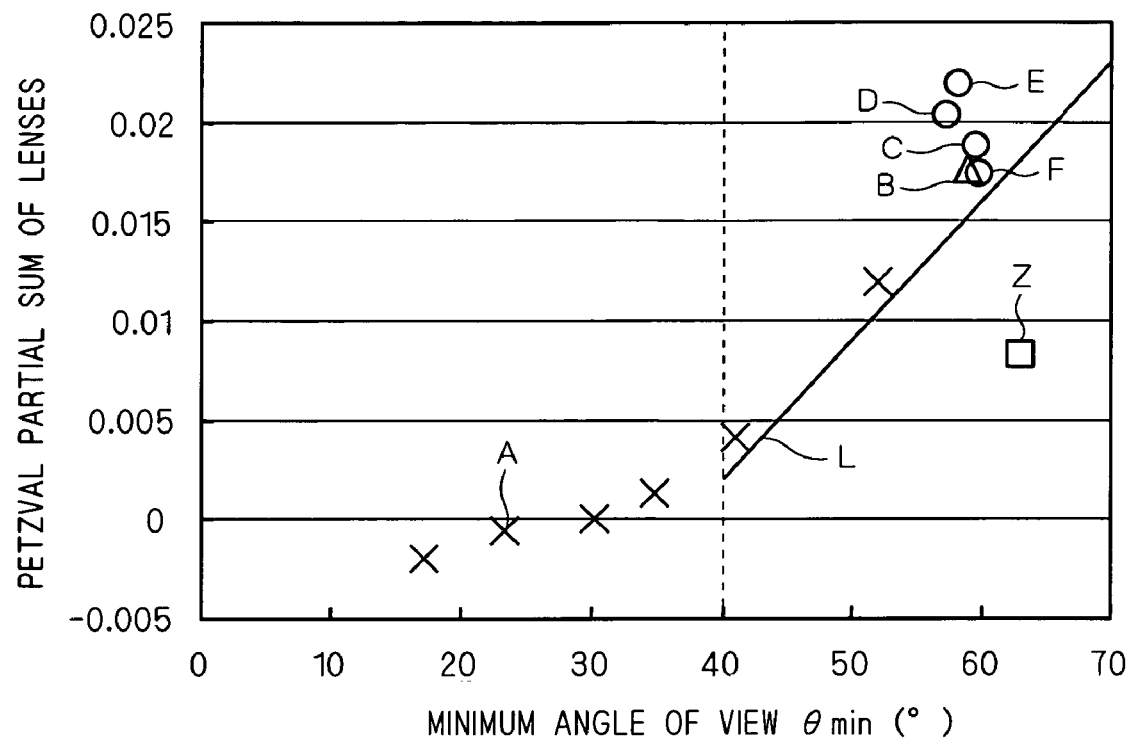
FIG. 5 A diagram showing a relation between minimum angle of view and Petzval partial sum of lenses.

Also, FIG. 5 shows a relation between values of the Petzval partial sum of lenses and minimum angle of view θmin exhibited when the angle of projection view is varied.

In FIG. 5, the horizontal axis shows values of the minimum angle of view θmin (°) and the vertical axis shows values of the Petzval partial sum of lenses, where the characteristic points shown with x in FIG. 5 indicate characteristics obtained when optical data was modified to vary the angle of projection view in the configuration of the first experimental example, i.e., with the configuration of lenses shown in FIG. 2. Among the characteristic points, the numerical value A indicates the characteristic obtained with the optical system based on the optical data shown in Tables 1 and 2. The other characteristic points shown with x are characteristics obtained when the angle of projection view was varied using pieces of optical data different from those of Tables 1 and 2, where the pieces of optical data were optimized such that the optical performance, about resolving power, distortion, etc., was at an approximately equivalent level to that of the characteristic A. The minimum angle of view θmin indicates a minimum value of the angle formed between a normal to the screen surface and principal rays incident upon the screen.

It is seen from FIG. 5 that, in the configuration of the first experimental example, even if the Petzval partial sum of lenses is large, sufficient performance (about resolving power, distortion, etc.) is obtained at increased angles of projection view. This means that it is possible to realize sufficient performance as long as the minimum angle of view θmin is large to a certain extent, without reducing the Petzval partial sum of the lenses.

That is, when the angle of projection view is large, it is difficult to obtain good performance throughout the whole range of angle of projection view including the optical axis, and so the optical system was designed to optimize the performance only within the actually employed range of angle of projection view, and then desired performance was obtained even when the Petzval partial sum of the lenses was not necessarily small.

On the other hand, when the minimum angle of view θmin is small and good performance is to be obtained throughout a wide range of angle of projection view, or when good performance is to be obtained throughout the whole range of angle of projection view including the optical axis, a more complicated structure of lenses is necessary to set small the Petzval partial sum of the lenses, which results in increased costs.

Referring to FIG. 5, when the minimum angle of view θmin is 40° or less, the Petzval partial sum of the lenses does not vary sharply as the minimum angle of view θmin varies, but the Petzval partial sum of the lenses rapidly varies when the minimum angle of view θmin exceeds 40°.

This means that, when the minimum angle of view θmin is 40° or less, and if the value of Petzval partial sum of lenses is not kept small, sufficient performance (about resolving power, distortion, etc.) cannot be obtained even when the minimum angle of view θmin is increased, but, when the minimum angle of view θmin exceeds 40°, sufficient performance (about resolving power, distortion, etc.) can be obtained even when the Petzval partial sum of lenses is increased.

Thus, when the optical system is designed such that the minimum angle of view θmin exceeds 40°, there is no need to configure it so as to reduce the Petzval partial sum of the lenses, and a high-performance projecting optical system is realized even with a simplified lens configuration.

Accordingly, the optical system of the first experimental example was modified to increase the minimum angle of view θmin and the Petzval partial sum of lenses, and an image projector 90 was thus obtained and examined as a second experimental example. The second experimental example will now be described.

Second Experimental Example

Figure 6:
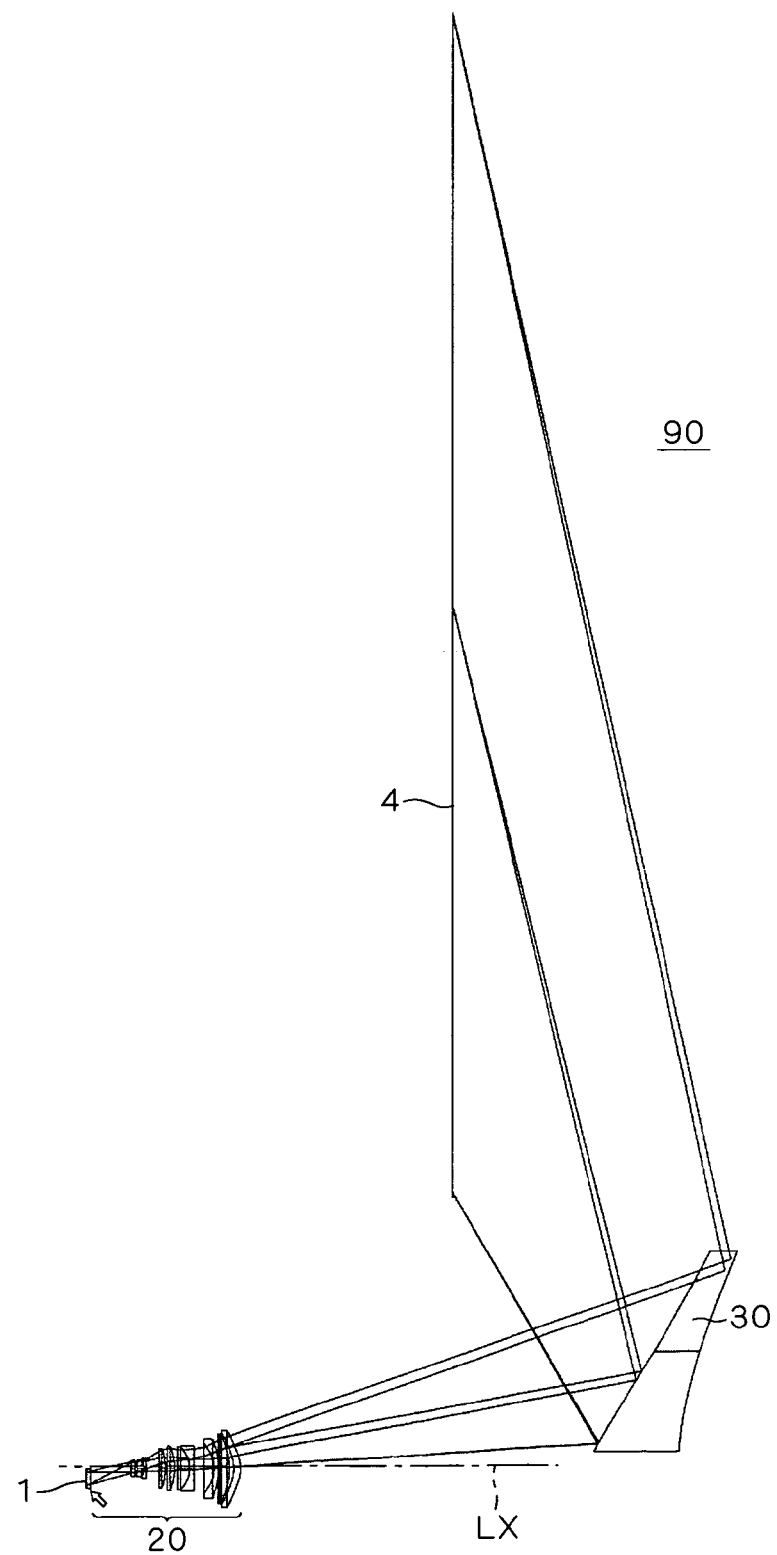
FIG. 6 A diagram showing the configuration and optical path of an image projector according to a second experimental example produced in the process through which the present invention was achieved.

FIG. 6 shows the configuration and optical path of the image projector 90. The same components as those of the image projector 80 of FIG. 1 are shown at the same reference characters and are not described again here.

As shown in FIG. 6, the image projector 90 includes a reflecting light valve 1, a group of refracting lenses 20 forming a projecting optical system for enlarging and projecting an optical image given from the light valve 1, a power mirror 30 having a power and forming the projecting optical system together with the group of refracting lenses 20, and a transmissive screen 4 for displaying the optical image that is given from the light valve 1 and enlarged by the projecting optical system. The center of the light valve 1 is offset vertically downward from the optical axis LX of the projecting optical system.

Figure 7:
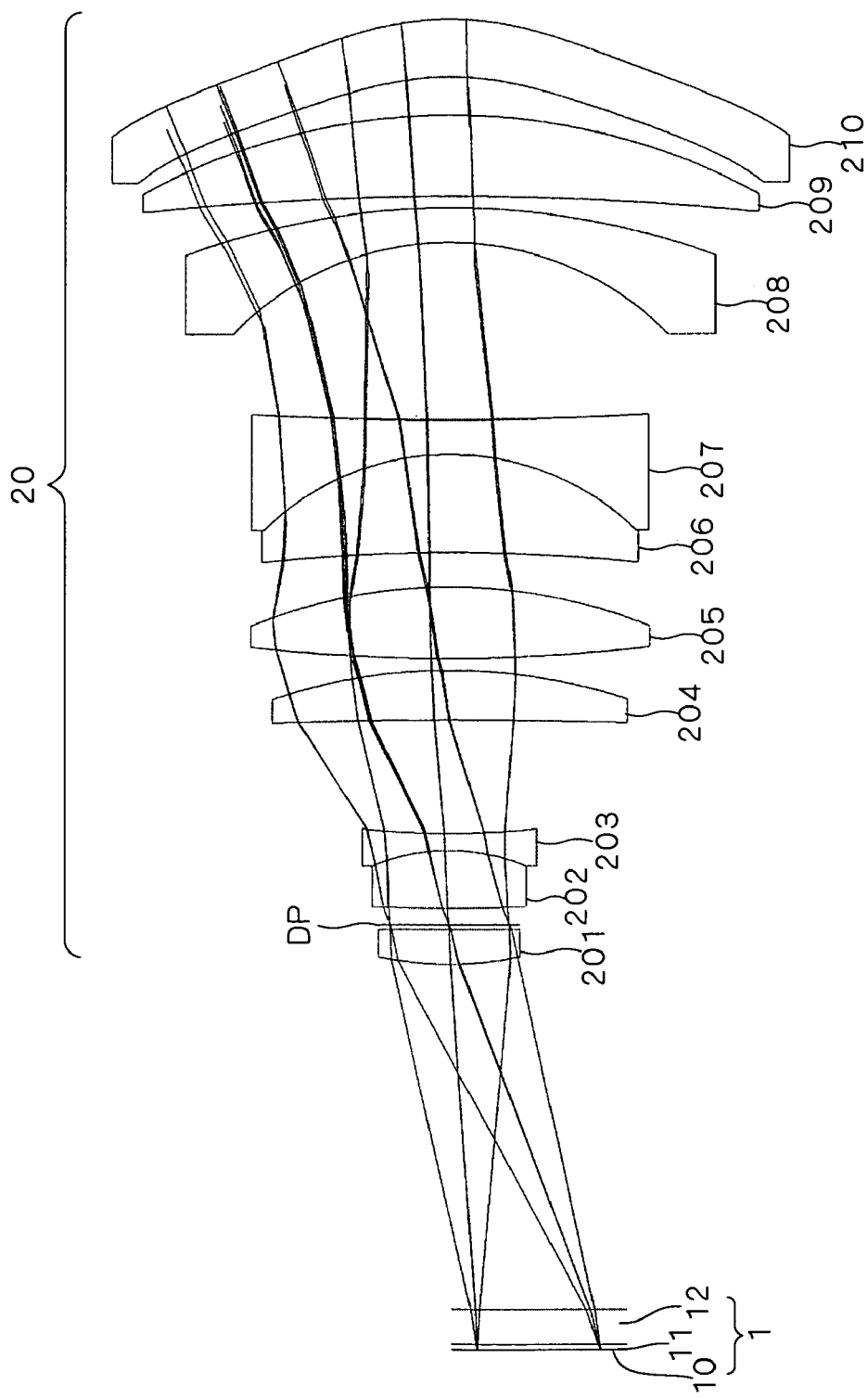
FIG. 7 A diagram showing the configuration of the lens system of the image projector of the second experimental example produced in the process of achieving the invention.

FIG. 7 shows the configuration of the group of refracting lenses 20. The group of refracting lenses 20 is formed of a combination of ten lenses, from a lens 201 placed closest to the light valve 1 to a lens 210 placed most distant from the light valve 1. A diaphragm DP is provided between the lenses 201 and 202. Optical data was optimized such that the optical performance, about resolving power, distortion, etc., of the second experimental example was at an approximately equivalent level to that of the first experimental example.

Tables 3 and 4 show an example of optical data for the image projector 90.

TABLE 3

| Surf | R | d | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 25.138 | 3.00 | 1.69350 | 53.20 |
| S4 | −630.783 | 0.50 | | |
| S5 (DIAPHRAGM) | ∞ | 1.30 | | |
| S6 | 110.248 | 5.00 | 1.56883 | 56.04 |
| S7 | −14.717 | 1.50 | 1.84666 | 23.78 |
| S8 | 64.787 | 9.80 | | |
| S9 | −425.680 | 4.30 | 1.80518 | 25.46 |
| S10 | −41.385 | 1.00 | | |
| S11 | 125.705 | 6.20 | 1.80518 | 25.46 |
| S12 | −39.170 | 3.00 | | |
| S13 | −132.028 | 8.50 | 1.58313 | 59.46 |
| S14 | −20.184 | 3.00 | 1.80610 | 33.27 |
| S15 | 282.918 | 15.30 | | |
| S16 | −22.977 | 3.00 | 1.78470 | 26.10 |
| S17 | −56.464 | 1.00 | | |
| S18 | −212.519 | 7.00 | 1.54072 | 47.20 |
| S19 | −47.632 | 3.30 | | |
| S20* | −21.092 | 5.00 | 1.52996 | 55.80 |
| S21* | −20.823 | 255.00 | | |
| S22* | 40.373 | −100.00 | Mirror | |

Table 4 shows the conic coefficients and aspheric coefficients of the aspherical surfaces S3, S20, S21 and S22.

TABLE 4

| S3 | |
|---|---|
| k | 0 |
| A4 | −9.2919788E−06 |
| A6 | 2.1444801E−08 |
| A8 | 2.6834220E−10 |
| S20 | |
| k | −3.726401 |
| A4 | 8.6312756E−06 |
| A6 | −1.1309475E−08 |
| A8 | −4.9207838E−13 |
| A10 | −4.5117677E−15 |
| S21 | |
| k | −1.842845 |
| A4 | 1.9612920E−05 |
| A6 | −1.8576145E−08 |

TABLE 4-continued

| A8 | 1.6578398E−12 |
|---|---|
| A10 | −3.8659646E−16 |
| S22 | |
| k | −4.72742 |
| A1 | 2.0609380E−01 |
| A3 | −5.3145056E−06 |
| A4 | −4.5589958E−09 |
| A5 | 4.1443231E−10 |
| A6 | −3.1459350E−12 |
| A7 | 1.0487170E−14 |
| A8 | −1.3550380E−17 |

Now, with the configuration having the optical system obtained based on the optical data shown in Tables 3 and 4, the Petzval partial sum of the lenses with respect to a minimum angle of view θmin=58.8° is 0.01765, which is shown as a numerical value B with Δ in FIG. 5.

As shown in FIG. 5, in the second experimental example, the angle of projection view is larger than that of the first experimental example, and the minimum angle of view θmin is close to 60°, and as a result sufficient performance (about resolving power, distortion, etc.) can be obtained even when the Petzval partial sum of the lenses is larger.

Figure 8:
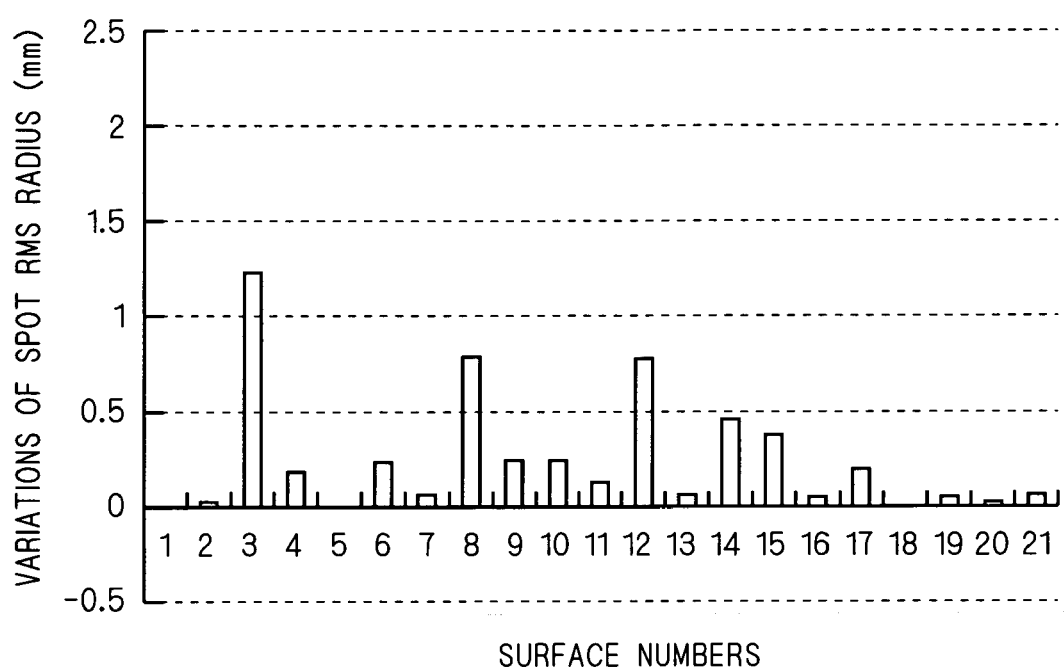
FIG. 8 A diagram showing variations of spot RMS radius exhibited when the lens surfaces are decentered in the image projector of the second experimental example produced in the process of achieving the invention.

Next, FIG. 8 shows variations of the spot RMS radius exhibited when the lens surfaces are decentered.

In FIG. 8, the horizontal axis shows the surface numbers (without letter S) and the vertical axis shows variations (mm) of the spot RMS radius exhibited when the lens surfaces are tilted at 0.05° vertically downward around the surface vertexes. The variations of the spot RMS radius were obtained under the same conditions as those of the group of refracting lenses 2 of the image projector 80.

It is known from FIG. 8 that, in the second experimental example, the Petzval partial sum of the lenses is larger and therefore the variations of the spot RMS radius are smaller and the sensitivity to decentering is smaller than in the first experimental example shown in FIG. 4.

Through the examinations described so far, it is seen that designing the optical system such that the minimum angle of view θmin exceeds 40° removes the need for a structure for reducing the Petzval partial sum of lenses and reduces the sensitivity to decentering of the lens system.

Next, desired values of the Petzval partial sum of lenses will be described with Expression (4) below.

$$PL > 0.0007 \times \theta min - 0.026 \quad (4)$$

Expression (4) shows that it is desirable that the Petzval partial sum of lenses have values above the line L in FIG. 5.

That is, as the minimum angle of view is enlarged by setting the exit pupil position of the projecting optical system closer to the screen, the maximum angle of view also becomes larger accordingly. However, the minimum angle of view increases at a greater rate because the optical path length corresponding to the minimum angle of view is shorter, and the difference between the maximum angle of view and the minimum angle of view, i.e., the substantial, employed range of angle of projection view, becomes narrower. In this case, even when a simplified structure is adopted such that the Petzval partial sum of lenses is large, or the index of the curvature of field in the vicinity of the optical axis is large, the curvature of field can be corrected only within the narrower, substantially employed range of angle of projection view in the wide-angle region, and good performance can be realized. Also, the correction of the curvature of field becomes easier as the employed range of angle of projection view becomes narrower, and so the Petzval partial sum of lenses can be set larger.

From above, it is known that the Petzval partial sum of lenses can be set larger as the minimum angle of view is set larger. Then, the relation between the Petzval partial sum of lenses and the minimum angle of view exceeding 40°, obtained from the first and second experimental examples, can be approximated with the line L shown in FIG. 5, where, when the minimum angle of view exceeds 40°, good performance can be realized with a simpler structure even when the Petzval partial sum has a large value reaching the line L.

The seventh embodiment of the Patent Document 2, mentioned earlier, discloses a projecting optical system which is formed of a group of lenses and a power mirror, and in which the minimum angle of view θmin=63°. The Petzval partial sum of lenses, calculated from example values, is 0.00830, which is shown as a numerical value Z with □ in FIG. 5. In FIG. 5, the numerical values C to F are the values of Petzval partial sum of lenses in the image projectors of the first to fifth preferred embodiments of the invention described below. As can be seen from FIG. 5, in the seventh embodiment of Patent Document 2, the minimum angle of view is equivalent to those of the present invention, but the Petzval partial sum of lenses is so small and less than half the values of the image projectors of the first to fifth preferred embodiments of the invention.

In this way, in conventional wide-angle projecting optical systems formed of a group of lenses and a power mirror, it was necessary to make small the Petzval partial sum of lenses in order to correct the curvature of field, which required a complicated lens structure.

However, the experiments and examinations by the inventors have shown that, even when the Petzval partial sum of lenses is so large as to reach the value on the right side of Expression (4), it is possible to make the curvature of field substantially small and to obtain a projecting optical system with good performance and small sensitivity to decentering.

Also, allowing a larger value of Petzval partial sum of lenses means that the lens configuration can be simplified without a need for a complicated lens configuration for correcting the curvature of field, and it is therefore desirable to set the Petzval partial sum of lenses still larger over the value shown on the right side of Expression (4), in order to realize a still simpler configuration.

That is, it is concluded that a projecting optical system with good performance, simple structure, and reduced sensitivity to decentering can be realized by setting the minimum angle of view larger and setting the Petzval partial sum of lenses larger over the value on the right side of Expression (4).

On the basis of our conclusion above, the inventors successfully obtained an image projector with a still simpler lens configuration by designing a new optical system such that the minimum angle of view θmin exceeds 40° and the Petzval partial sum has a larger value.

A. First Preferred Embodiment

Now, referring to FIGS. 9 to 14, the configuration and operation of an image projector 100 according to a first preferred embodiment of the invention will be described.

Figure 9:
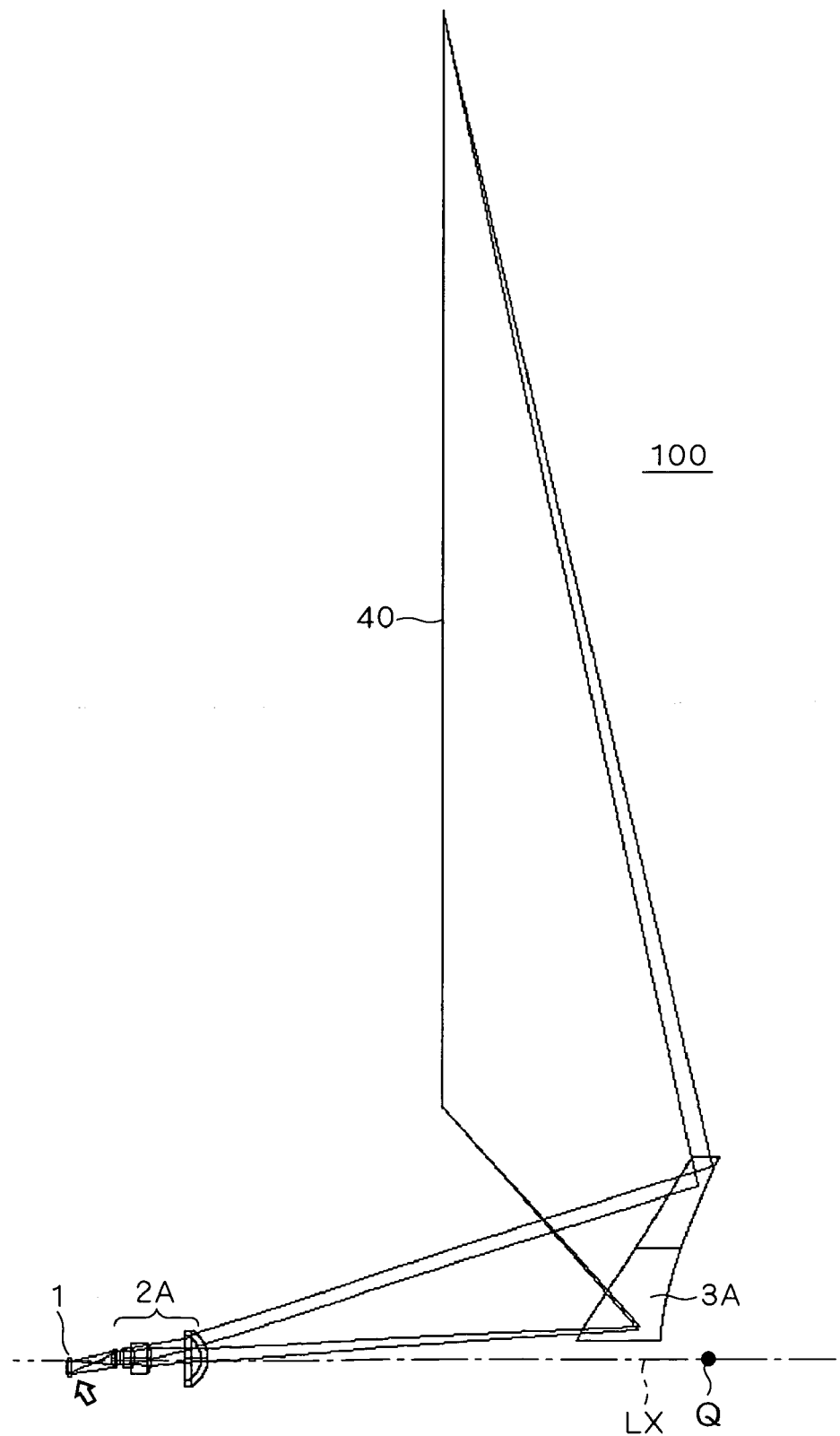
FIG. 9 A diagram showing the configuration and optical path of an image projector according to a first preferred embodiment of the present invention.
Figure 10:
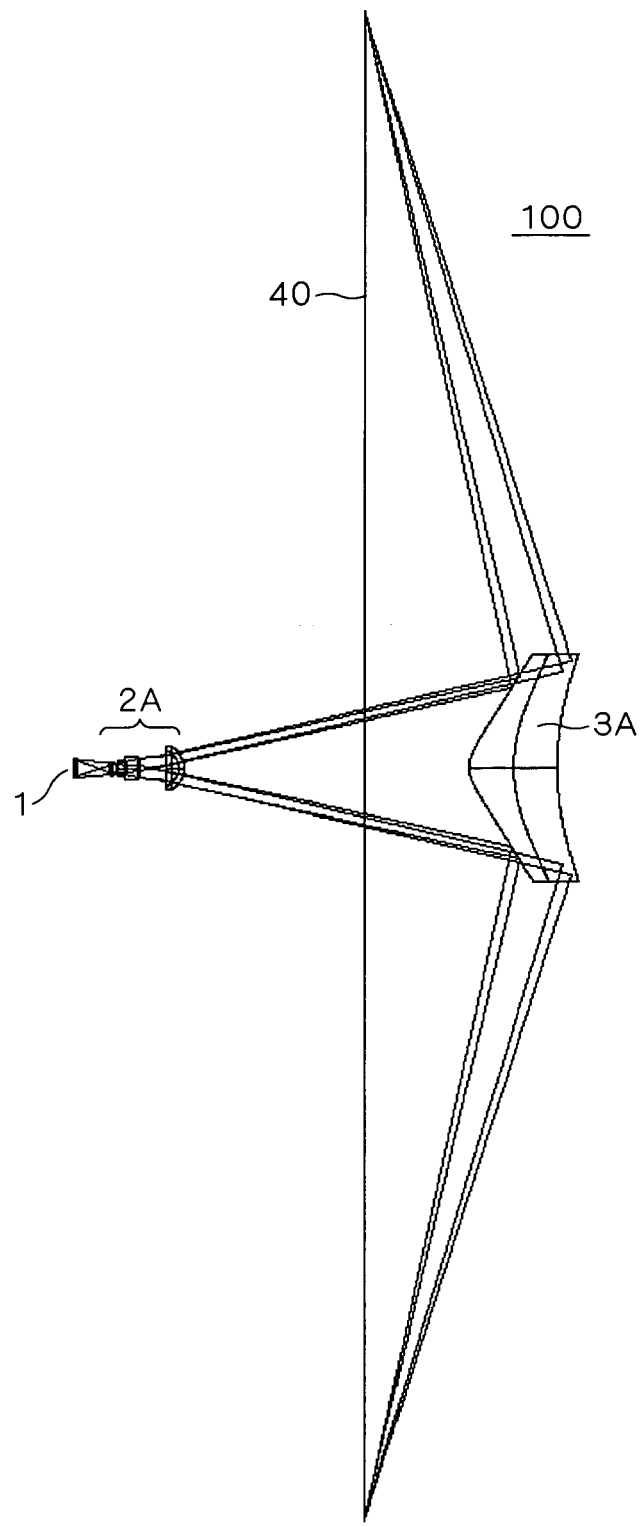
FIG. 10 A diagram showing the configuration and optical path of the image projector of the first preferred embodiment of the invention.

FIGS. 9 and 10 show the configuration and optical path of the image projector 100. The same components as those of the image projector 80 of FIG. 1 are shown at the same reference characters and not described again here.

As shown in FIG. 9, the image projector 100 includes a reflecting light valve 1, a group of refracting lenses 2A forming a projecting optical system for enlarging and projecting an optical image given from the light valve 1, a power mirror 3A having a power and forming the projecting optical system together with the group of refracting lenses 2A, and a transmissive screen 40 for displaying the optical image that is given from the light valve 1 and enlarged by the projecting optical system. In FIG. 9, the direction in which the screen 40 extends is referred to as a vertical direction, the upward direction in FIG. 9 is referred to as vertically upward, the downward direction is referred to as vertically downward, and the direction perpendicular to the vertical direction is referred to as a horizontal direction. These definitions are used also in all of the preferred embodiments described later.

The center of the light valve 1 is offset vertically downward from the optical axis LX of the projecting optical system, and illumination light from an illumination optical system, not shown, enters the light valve 1 from obliquely downward as shown by the arrow in the drawing. The group of refracting lenses 2A is disposed such that the optical axis LX is perpendicular to the main surface of the screen 40. The main surface of the mirror 10 (the display surface of the light valve 1) is approximately parallel to the main surface of the screen 40, and the display surface of the light valve 1 and the main surface of the screen 40 are perpendicular to the optical axis LX. This relation applies also to the second to fifth preferred embodiments described later.

When the amount of offset of the light valve 1 is increased, the position of the projected image proportionally shifts vertically upward, which leads to an increased height dimension of the entire device. The position of the projected image can thus be adjusted by adjusting the amount of offset. In the present invention, it is necessary to offset the light valve 1 because only part of a high angle-of-view portion distant from the optical axis is used.

When the amount of offset is too small, the illumination light entering the light valve 1 from the illumination optical system not shown may interfere with the projecting lens barrel, or the lenses, mirrors, or holder of the illumination optical system may interfere with the projecting lens barrel, and therefore the amount of offset is determined by considering the dimensions of the entire device and the interference with the illumination light.

Accordingly, it is desirable that the amount of offset, S, expressed by the distance from the optical axis to the center of the light valve, satisfy the relation below, where H is half of the vertical dimension of the projected image.

$$H < S < 2H \qquad (5)$$

When the amount of offset S is below the lower limit, interference occurs between the group of projecting lenses and the projected light flux. When it is over the upper limit, the height dimension becomes too large and the entire device is sized larger.

Also, considering the prevention of interference with the projected light flux and the realization of a more compact device structure, it is more desirable that the amount of offset S satisfy the relation below.

$$1.2H < S < 1.8H \qquad (6)$$

In the image projector 100, the amount of offset of the light valve 1 is 7.2 mm and S=1.46H.

FIG. 9 shows the configuration of the image projector 100 seen from the side (in a direction in which the screen extends laterally), where the power mirror 3A has a surface inclined with respect to the vertical direction of the screen 40 so that it can project the optical image in an enlarged manner vertically with respect to the screen 40.

FIG. 10 shows the configuration of the image projector 100 seen from above the screen 40, and the power mirror 3A has surfaces respectively inclined with respect to the lateral direction of the screen 40 so that it can project the optical image in an enlarged manner also laterally with respect to the screen 40.

In reality, the power mirror 3A is shaped to have rotational symmetry with respect to the optical axis LX, but FIGS. 9 and 10 show only the effective region upon which light impinges.

The group of refracting lenses 2A is disposed to face the reflecting surface of the power mirror 3A, and the power mirror 3A has a large negative power and designed to further enlarge the optical image given from the light valve 1 and enlarged by the group of refracting lenses 2A, and also to correct distortion. The power mirror 3A is aspherically shaped such that its curvature decreases toward the periphery, because the power mirror 3A would produce large positive distortion when shaped spherically.

Figure 11:
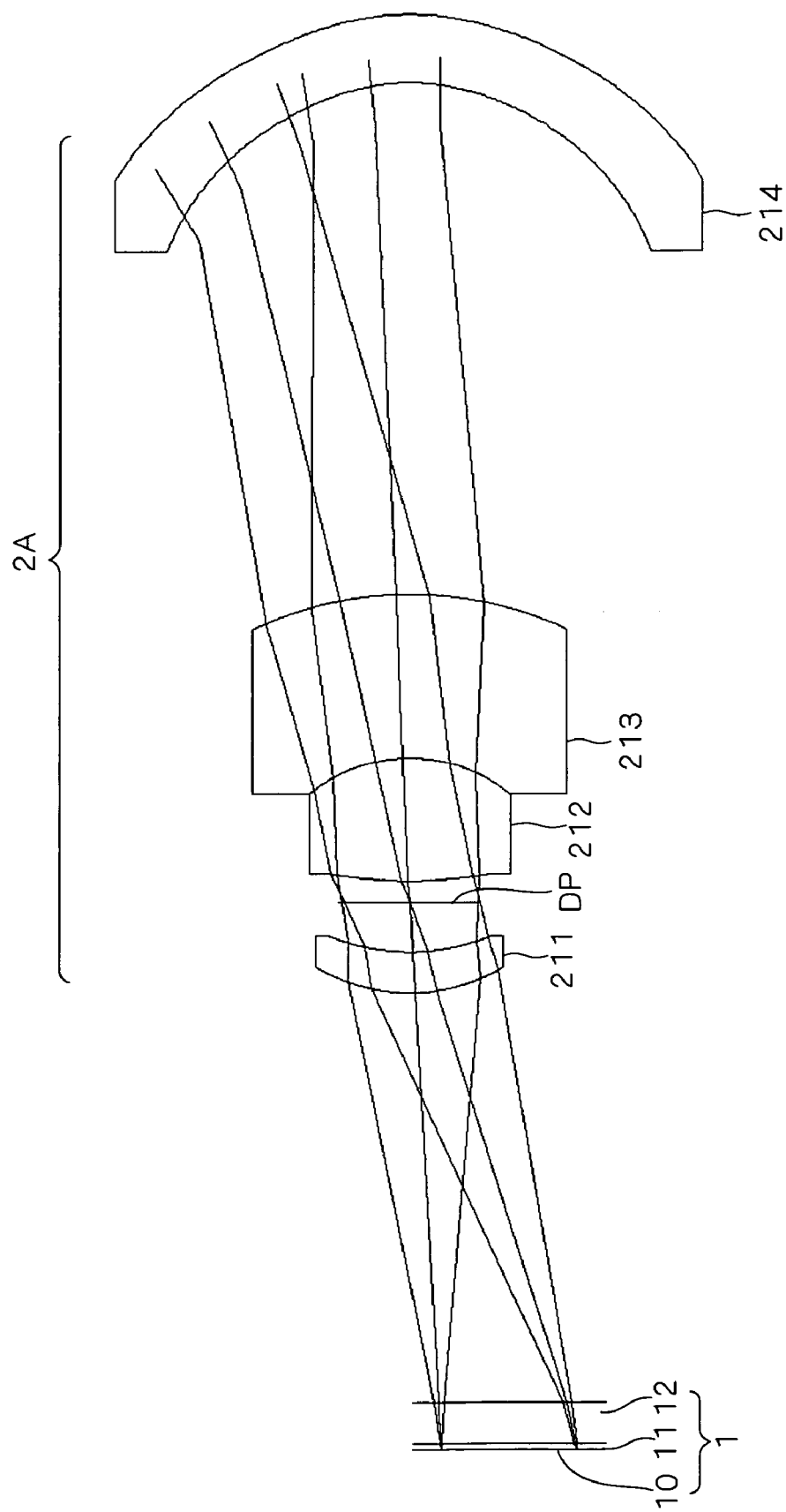
FIG. 11 A diagram showing the configuration of the lens system of the image projector of the first preferred embodiment of the invention.

FIG. 11 shows the configuration of the group of refracting lenses 2A. The group of refracting lenses 2A is formed of a combination of four lenses, from a lens 211 placed closest to the light valve 1 to a lens 214 placed most distant from the light valve 1. A diaphragm DP is provided between the lenses 211 and 212. The light valve 1 has a glass plate 12 protecting the surface of the mirror 10, and an air layer 11 is present between the surface of the mirror 10 and the glass plate 12.

More specifically, the lens 211 is a meniscus lens convex-shaped on the reduction side, the lens 212 and the lens 213 form a cemented lens of a set of positive and negative lenses, and the lens 214 is a meniscus lens convex-shaped on the magnifying side.

The lens 211, convex-shaped on the reduction side, has an aspherical surface on the reduction side, with a weak positive power. Preferably, it is formed of molded glass having stable temperature characteristic because it is disposed near the diaphragm DP and so has a small diameter, and also because the temperature in the vicinity of the entrance pupil will be elevated.

The cemented lenses 212 and 213 form an achromatic lens including a positive lens with a smaller refractive index and a larger Abbe constant and a negative lens having a larger refractive index and a smaller Abbe constant, which has a strong positive power.

The lens 214, convex-shaped on the magnifying side, is a bi-aspheric lens having a weak negative power. It has a large diameter and therefore it is desirably formed of molded resin. Considering temperature characteristic, the power of the lens is set as small as possible.

The group of refracting lenses 2A has a positive power on the whole, and it is designed to enlarge an optical image given from the light valve 1 and to correct astigmatism, chromatic aberration, and the like.

When the group of refracting lenses 2A shown in FIG. 11 is compared with the groups of refracting lenses 2 and 20 shown respectively in FIGS. 2 and 7, the number of lenses of the group of refracting lenses 2A is reduced to less than half and the lens configuration is simplified.

The configuration of lenses can be simplified in this way for the following reason. On the basis of the technical idea that the minimum angle of view θmin is to be set large over 40°, the exit pupil position of the projecting optical system is set closer to the screen in order to set larger the minimum angle of view θmin and Petzval partial sum of lenses, and as a result the range of angle of projection view is made smaller, whereby the requirements for the optical system are reduced and the burden of the optical designing is lightened, making it possible to obtain good performance with a simplified lens structure while achieving high angle of view.

This will be described in more details.

That is, as explained earlier, the curvature of field generally becomes larger as the angle of projection view becomes larger, and it is then effective to reduce the absolute value of the Petzval sum shown by Expressions (1) and (2) in order to correct the curvature of field.

However, the Petzval sum is an index based on the third-order aberration theory and indicates the curvature of field in the vicinity of the optical axis, and it does not indicate the actual state of the curvature of field in the optical system of the preferred embodiment that uses only part of a high angle-of-view portion separated far from the optical axis.

Also, in general, in a lens structure that reduces the Petzval sum, when the total lens length is kept constant, the light rays must be bent at sharper angles and lenses with large powers are required, and then the lenses exhibit increased sensitivity to decentering. When the angles at which the light rays are bent are kept constant in order to solve this problem, the total lens length is lengthened.

However, since the projecting optical system of the image projector 100 of this preferred embodiment employs only a part of a high angle-of-view portion separated far from the optical axis, the curvature of field in the actually employed, limited range of angle of projection view can be satisfactorily corrected even if the Petzval partial sum of the lenses is not necessarily small.

Accordingly, in the image projector 100, the lenses of the projecting optical system were designed intensively to achieve simplification of the lens structure, reduction of sensitivity to decentering, and enhanced performance like enhanced resolving power and enhanced distortion correcting ability, without a need to stick to the reduction of the Petzval partial sum of lenses.

Now, Tables 5 and 6 show an example of optical data for the image projector 100.

In Table 5, Surf indicates surface numbers S1 to S11 assigned sequentially to the surfaces of the individual components, with the surface of the mirror 10 of the light valve 1 (FIG. 11) shown as OBJ and the surface of the power mirror 3A shown as S11, and R is the radius of curvature (mm) of each component, d is surface separation (mm), nd is refractive index of d-ray (waveform 587.6 nm), and vd is Abbe constant. The mirror surface of the power mirror 3A is indicated as Mirror. The marks * added to surface numbers indicate aspherical surfaces, and the Expression (3) that expresses the amount of sag Z(R), described earlier, is used to define aspherical form.

The diagonal dimension of the light valve 1 is 20.09 mm (aspect ratio 16:9), the diagonal dimension of the projected image is 1685.04 mm, and the F-number on the reduction side is 3.5. These conditions are used also in the second to fifth preferred embodiments described later.

TABLE 5

| Surf | r | d | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 13.089 | 3.00 | 1.58913 | 61.25 |
| S4 | 15.976 | 3.60 | | |
| S5 (DIAPHRAGM) | ∞ | 1.60 | | |
| S6 | 33.833 | 9.00 | 1.54072 | 47.20 |
| S7 | −11.355 | 12.00 | 1.84666 | 23.78 |
| S8 | −26.506 | 37.40 | | |

TABLE 5-continued

| Surf | r | d | nd | vd |
|---|---|---|---|---|
| S9* | −15.143 | 5.00 | 1.52996 | 55.80 |
| S10* | −18.917 | 270.20 | | |
| S11* | 42.737 | −95.94 | Mirror | |

Table 6 shows the conic coefficients and aspheric coefficients of the aspherical S9, S10 and S11.

TABLE 6

| S3 | |
|---|---|
| k | −1.39321 |
| A4 | 5.1677142E−05 |
| A6 | 1.1067535E−07 |
| A8 | 4.7095575E−10 |
| S9 | |
| k | −0.3909041 |
| A4 | 5.1056110E−05 |
| A6 | −1.7345374E−07 |
| A8 | 3.8512224E−10 |
| A10 | −5.0175859E−13 |
| S10 | |
| k | −1.034843 |
| A4 | 2.6227533E−05 |
| A6 | −8.9472776E−08 |
| A8 | 1.0708366E−10 |
| A10 | −9.7296626E−14 |
| S11 | |
| k | −4.937584 |
| A1 | 2.1907976E−01 |
| A3 | −3.9704065E−06 |
| A4 | −2.4159184E−08 |
| A5 | 5.5000990E−10 |
| A6 | −3.6309342E−12 |
| A7 | 1.1300689E−14 |
| A8 | −1.4029196E−17 |

Figure 12:
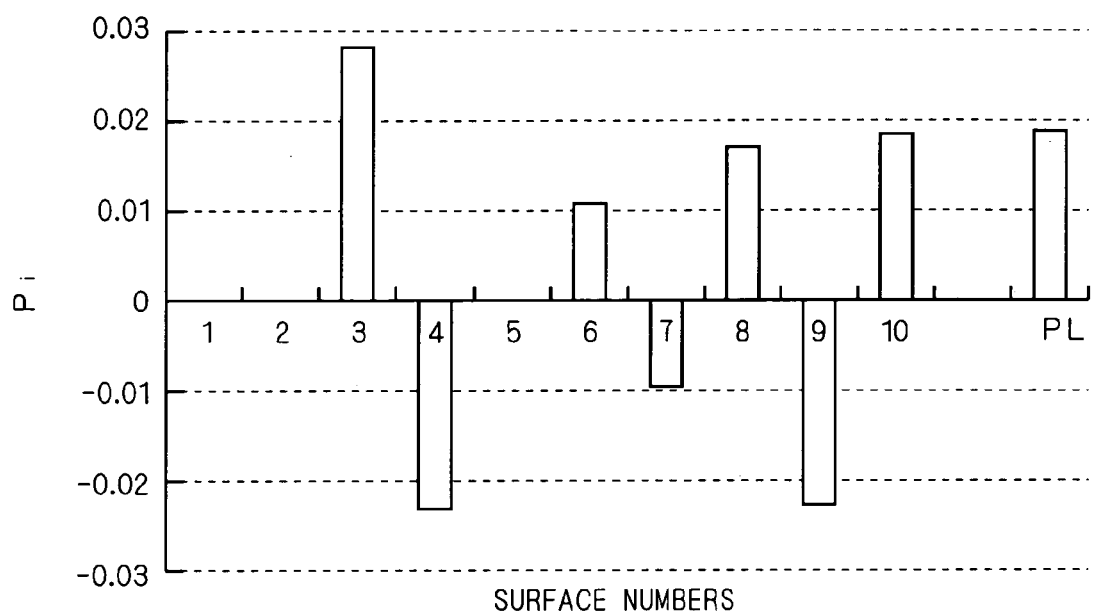
FIG. 12 A diagram showing values of $p_i$ of individual lens surfaces of the image projector of the first preferred embodiment of the invention.

Next, FIG. 12 is a bar graph showing values of $p_i$ of the lens surfaces of the group of refracting lenses 2A shown in FIG. 11.

In FIG. 12, the horizontal axis shows the surface numbers (without letter S) and the vertical axis shows the values of $p_i$ of the individual lens surfaces. FIG. 12 also shows the Petzval partial sum PL of the lenses. PL=0.01876 in the first preferred embodiment.

Referring to FIG. 12, it is seen that the Petzval partial sum of the lenses has a large positive value, and it is added to the plus value of the Petzval partial sum of the power mirror 3A to result in a large Petzval sum of the entire projecting optical system.

Figure 13:
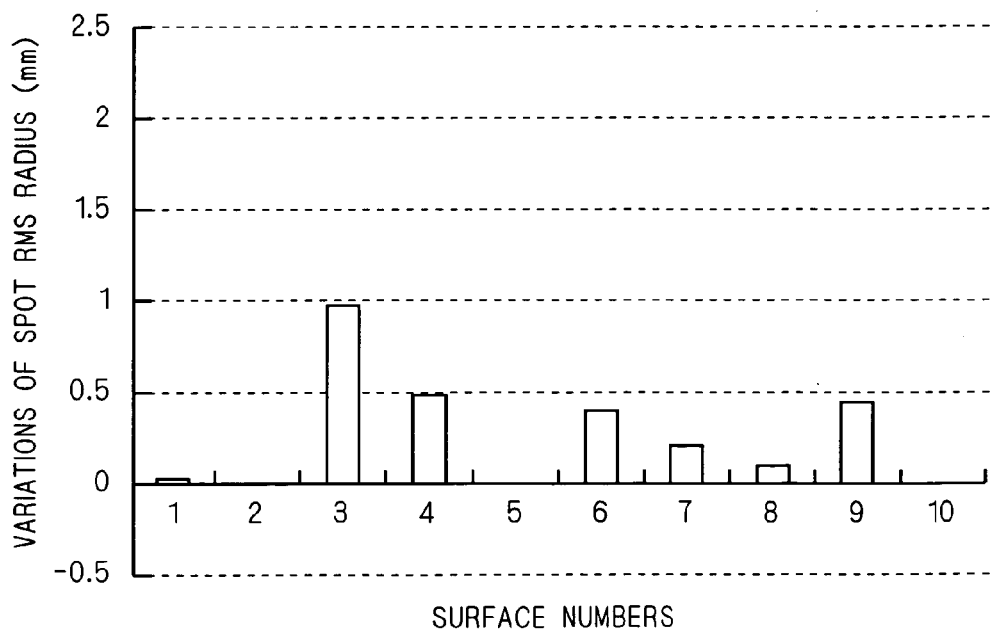
FIG. 13 A diagram showing variations of spot RMS radius exhibited when the lens surfaces are decentered in the image projector of the first preferred embodiment of the invention.

Now, FIG. 13 shows variations of the spot RMS radius exhibited when the lens surfaces are decentered. In FIG. 13, the horizontal axis shows the surface numbers (without letter S) and the vertical axis shows variations (mm) of the spot RMS radius exhibited when the lens surfaces are tilted 0.05° vertically downward around the surface vertexes.

To express the variations of spot RMS radius, a lateral half of the screen is divided into lattice sections of vertical×horizontal: 3×2, and the means of values at the 12 lattice points were used.

Referring to FIG. 13, the variation exhibits the maximum value at the third surface, but the maximum value of the variation is smaller than that of the first experimental example described with FIG. 4, and it is seen that the sensitivity to decentering was reduced by adopting the lens structure providing a larger Petzval partial sum of lenses.

In the image projector 100 having the optical system obtained on the basis of the optical data shown in Tables 5 and 6, the minimum angle of view θmin is 59.5°, and the corresponding value of the Petzval partial sum of the lenses is shown as a numerical value C with O in FIG. 5 which, as described earlier, shows a relation between the minimum angle of view θmin and the Petzval partial sum of lenses, with varied angle of projection view.

It is seen from FIG. 5 that the minimum angle of view θmin of the image projector 100 is still larger than the numerical value B of the second experimental example, and the Petzval partial sum of the lenses also has a larger value.

Next, Table 7 shows values of differences between the angles of incidence and exit (°) of the principal rays at minimum and maximum image heights at the individual lens surfaces of the structure of the second experimental example. Table 8 shows values of differences between the angles of incidence and exit (°) of principal rays at minimum and maximum image heights at the individual lens surfaces in the structure of the first preferred embodiment.

TABLE 7

| SURFACE NUMBERS | MINIMUM IMAGE HEIGHT | MAXIMUM IMAGE HEIGHT |
|---|---|---|
| 1 | 1.23 | 7.85 |
| 2 | 1.23 | 7.89 |
| 3 | 1.39 | 8.81 |
| 4 | 1.64 | 10.65 |
| 5 | 0.00 | 0.00 |
| 6 | 1.47 | 9.58 |
| 7 | 0.20 | 1.21 |
| 8 | 2.27 | 15.26 |
| 9 | 1.99 | 13.26 |
| 10 | 0.59 | 3.21 |
| 11 | 1.72 | 11.03 |
| 12 | 0.67 | 5.64 |
| 13 | 0.04 | 0.63 |
| 14 | 0.52 | 3.95 |
| 15 | 1.33 | 8.21 |
| 16 | 1.59 | 10.71 |
| 17 | 1.15 | 6.91 |
| 18 | 1.62 | 10.34 |
| 19 | 0.10 | 1.39 |
| 20 | 1.84 | 2.06 |
| 21 | 2.57 | 1.41 |

TABLE 8

| SURFACE NUMBERS | MINIMUM IMAGE HEIGHT | MAXIMUM IMAGE HEIGHT |
|---|---|---|
| 1 | 1.10 | 7.06 |
| 2 | 1.10 | 7.06 |
| 3 | 0.62 | 3.83 |
| 4 | 1.10 | 6.98 |
| 5 | 0.00 | 0.00 |
| 6 | 1.41 | 9.24 |
| 7 | 0.01 | 0.07 |
| 8 | 0.23 | 1.37 |
| 9 | 2.57 | 13.77 |
| 10 | 2.19 | 8.19 |

In general, when a ray of light undergoes refraction at a lens surface, a greater aberration is produced at the surface as the difference between the angles of incidence and exit at the surface increases. Accordingly, it is more effective, for superior and stable optical performance, to moderately refract the light ray with a larger number of lenses with distributed powers, rather than to sharply refract it with a smaller number of lenses. That is, in a structure having a smaller number of lenses, the light ray is greatly refracted at individual lens surfaces and therefore larger amounts of aberrations are produced at the individual lens surfaces. Then, the structure is configured by combining them so that they cancel each other to exhibit a smaller aberration on the whole, in which case the performance will be considerably deteriorated when the individual lenses are decentered. Also, in a structure adopted to reduce the Petzval sum, the sensitivity to decentering is likely to be large because of the need to sharply refract light rays.

However, as can be seen by comparing Tables 7 and 8, despite the fact that the minimum angle of view is larger and the number of lenses is greatly reduced in the first preferred embodiment (Table 8) than in the second experimental example (Table 7), the differences between the angles of incidence and exit at individual surfaces are smaller in the first preferred embodiment. This shows that the aberrations produced at the individual surfaces are smaller even though a smaller number of lenses are used, and the use of a smaller number of lenses lessens factors that produce errors like decentering, whereby stable performance is realized.

This means that, by setting a larger minimum angle of view, a lens structure that produces a larger Petzval partial sum of lenses can be adopted, and it eliminates the need to sharply refract the rays of light and enables superior and stable performance with a less number of lenses and with smaller sensitivity to decentering.

Originally, an optimum value of the Petzval partial sum of the lenses is not uniquely determined by the minimum angle of view, but it may vary depending on specifications such as the projecting magnification, the size of the power mirror, dimensions of the device, and the like.

An example thereof will be described referring to FIG. 27, in which the optimum value of the Petzval partial sum of the lenses varies depending on the exit pupil position.

FIG. 27 shows a relation between the exit pupil position and the range of angle of view, with a constant minimum angle of view $\theta$min. FIG. 27 assumes that the exit pupil position is set at R and S with respect to the screen 40, and the employed ranges of angle of view corresponding to the exit pupil positions R and S are shown as u and v.

It is seen from FIG. 27 that, even when the minimum range of angle of view $\theta$min is fixed, the employed range of angle of view varies depending on the exit pupil position. That is, the employed range of angle of view becomes smaller as the exit pupil position is separated farther from the screen, and the employed range of angle of view becomes larger as the exit pupil position is brought closer to the screen.

In the former case, the employed range of angle of view is smaller and the optical path length is longer, and so obtaining good performance is relatively easier, which allows a larger value of Petzval partial sum of lenses and also allows adopting a simpler lens structure. However, setting the exit pupil position distant from the screen will require a larger depth dimension of the device and a larger dimension under the screen.

On the other hand, in the latter case, the employed range of angle of view is larger and the optical path length is shorter, and so obtaining good performance is relatively difficult, which requires setting the Petzval partial sum of lenses at a relatively small value. However, setting the exit pupil position closer to the screen allows a smaller depth dimension of the device and a smaller dimension under the screen.

In this way, the exit pupil position is determined by considering the balance between the optical performance and the dimensions of the device, and the optimum value of Petzval partial sum of lenses can somewhat vary accordingly.

Also, when the image projector 100 of the first preferred embodiment is compared with an image projector 300 of the third preferred embodiment described later, the values of minimum angle of view are nearly equal but the power mirror of the third preferred embodiment is sized smaller and so the Petzval partial sum of lenses is larger by about 0.003.

Thus, the Petzval partial sum of lenses is not uniquely determined by the minimum angle of view. However, in the image projector of the present invention in which an optical image produced on a micro-device is projected onto a screen in an enlarged manner, specifications like the magnification factor determined by the sizing of the micro-device and screen, the depth dimension of the device, and the dimension under the screen, are approximately limited, and therefore the range of possible values of the Petzval partial sum PL of lenses can be limited.

That is, it is more desirable that the Petzval partial sum of lenses satisfy Expression (7) below, in addition to Expression (4).

$$PL < 0.0007 \times \theta min + 0.001 \quad (7)$$

Expression (4) shows the lower limit of the Petzval partial sum of lenses and Expression (7) shows its upper limit.

When the Petzval partial sum of lenses is smaller than the lower limit, the lens structure must be complicated and exhibits increased sensitivity to decentering. On the other hand, when the Petzval partial sum of lenses is larger than the upper limit, the exit pupil position, explained above, becomes too far from the screen, and then the device must be sized larger, or good performance cannot be obtained because the power mirror is sized small or because the magnification is set large. That is, good and stable performance can be realized with a simple structure by setting the exit pupil of the projecting optical system such that the minimum angle of view exceeds 40° and by setting the Petzval partial sum of lenses within the range defined by Expression (4) and Expression (7).

Now, in the first experimental example having the projecting optical system obtained based on the optical data shown in Table 1 and Table 2, the distance between the screen 40 and the exit pupil position of the projecting optical system was 463 mm. However, in the first preferred embodiment having the projecting optical system obtained based on the optical data shown in Table 5 and Table 6, it is 170 mm and the exit pupil is thus positioned closer to the screen 40.

In this way, shortening the distance between the screen 40 and the exit pupil position of the projecting optical system makes small the range of angle of projection view and makes large the angle of projection view.

Now, due to the aberration (pupil aberration) by the lens system following the diaphragm, the exit pupil position of the projecting optical system varies between the paraxial (angle of view of 0°) and rays at other angles of view. Accordingly, it is possible to assume the exit pupil position of the optical system to be at the exit pupil position derived by the paraxial theory, but, for the sake of convenience, this preferred embodiment defines the exit pupil position of the optical system to be at a middle position between the exit pupil positions at the maximum and minimum angles of view, because an odd-order aspherical surface is used for the power mirror and so the paraxial calculation is difficult, and also because the preferred embodiment employs a high angle-of-view portion separated far from the optical axis. This applies also to the second to fifth preferred embodiments described later. In FIG. 9, the exit pupil position is shown as a point Q. In the following description of the second to fifth preferred embodiments, too, the exit pupil position is shown as point Q in the diagrams corresponding to FIG. 9.

Setting the minimum angle of view θmin at a large value exceeding 40° is advantageous also because it allows the screen 40 to be structured simply.

Figure 14:
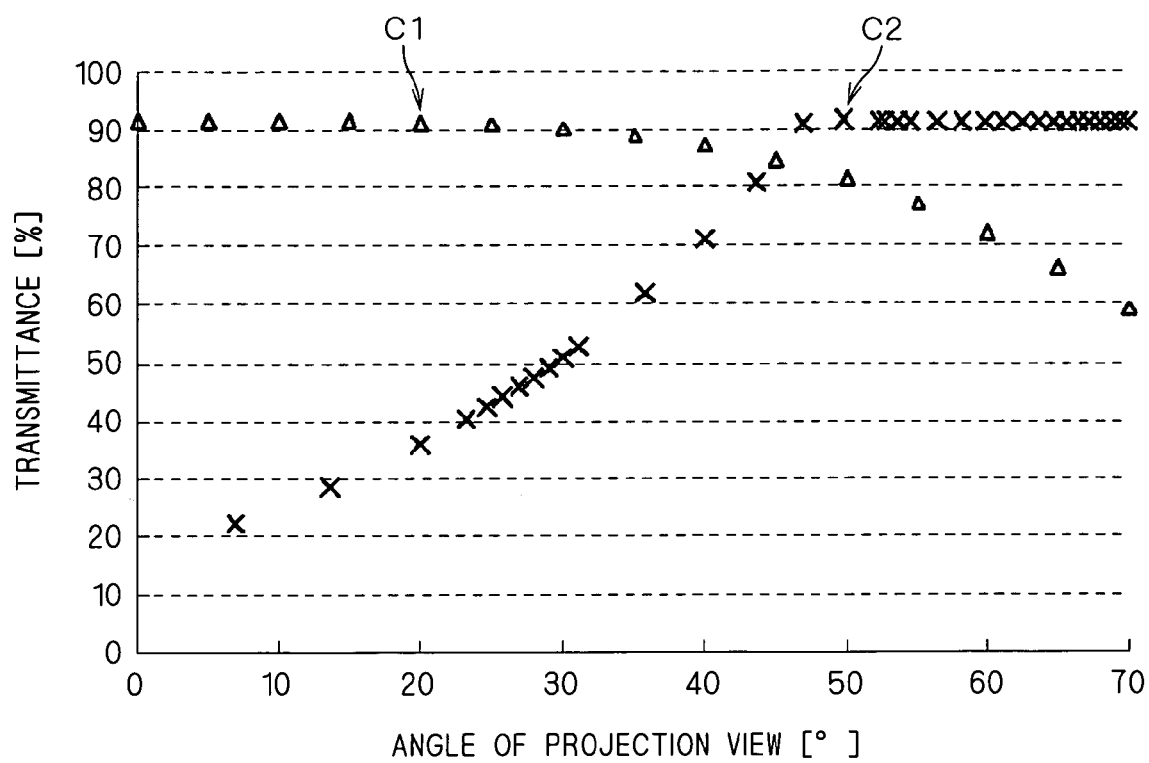
FIG. 14 A diagram showing a relation between angle of projection view and transmittance of refracting and total-reflecting Fresnel lenses.

FIG. 14 shows an example of values of light transmittance with respect to the angle of projection view, with a refracting Fresnel lens and a total-reflecting Fresnel lens.

In FIG. 14, the horizontal axis shows the angle of projection view (°) and the vertical axis shows the light transmittance (%), and the transmittance characteristic of the refracting Fresnel lens is shown as characteristic C1 and the transmittance characteristic of the total-reflecting Fresnel lens is shown as characteristic C2.

It is seen from FIG. 14 that the transmittance of the refracting Fresnel lens tends to decrease and deteriorate more sharply as the angle of projection view increases, which shows that the refracting Fresnel lens is suitable for the screen of an image projector having a central-projection optical system in which the angle of view in the center of the screen is 0°.

On the other hand, the transmittance of the total-reflecting Fresnel lens increases as the angle of projection view increases, and particularly the transmittance remains nearly fixed above an angle of projection view of about 47°. Accordingly, it is suitable particularly for the screen of an image projector having an oblique-projection optical system having a large angle of projection view. At the minimum angle of view of 40°, the light transmittance of the total-reflecting Fresnel lens is about 70%.

The image projector 100 of this preferred embodiment uses a projecting optical system having an extremely high angle of view (the minimum angle of view is about 60%), and so the screen 40 can be formed only of a total-reflecting Fresnel lens, and then the screen can be structured more simply at lower costs than when a refracting Fresnel lens is used in combination.

When projected light is refracted at a Fresnel lens, reflected light due to Fresnel reflection is necessarily produced. The reflected light travels an optical path differing from the intended optical path, and may become stray light to deteriorate the quality of the projected image.

For example, when there is a rear mirror in a position facing the screen, stray light coming out of the screen may be reflected at the rear mirror and reenter the screen to produce ghost. However, the image projector 100 of this preferred embodiment does not use a rear mirror and avoids this problem, since it uses a projecting optical system with an extremely high angle of view and can be sized sufficiently thin without using a rear mirror.

Not using a rear mirror enables cost reduction and weight reduction of the device and simplification of the housing structure, and also prevents deterioration of optical efficiency that would be caused by reflection loss of the mirror.

As described so far, the image projector 100 of the first preferred embodiment reduces the burden of optical designing and allows the lens structure to be configured more simply, and thus provides a high-performance image projector with simpler structure. Also, setting the minimum angle of view θmin larger allows the use of a total-reflecting Fresnel lens for the screen, which simplifies the structure of the screen and allows its cost reduction.

B. Second Preferred Embodiment

Now, referring to FIGS. 15 to 18, the configuration and operation of an image projector 200 according to a second preferred embodiment of the invention will be described.

Figure 15:
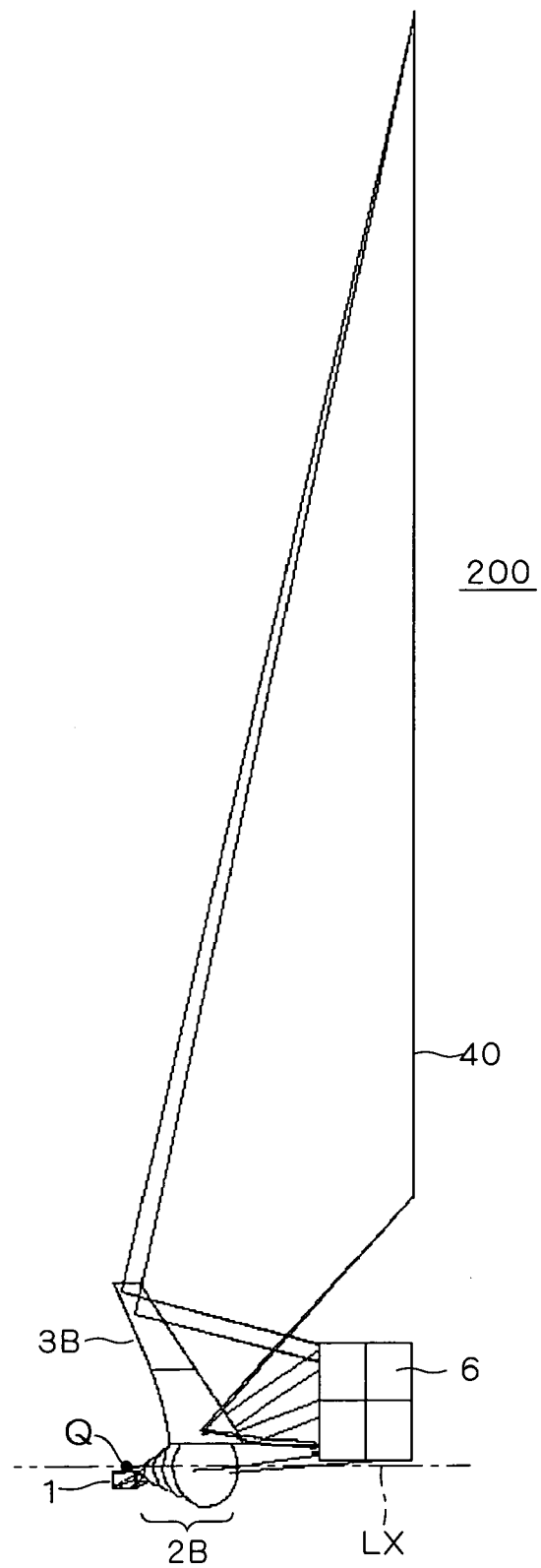
FIG. 15 A diagram showing the configuration and optical path of an image projector according to a second preferred embodiment of the present invention.
Figure 16:
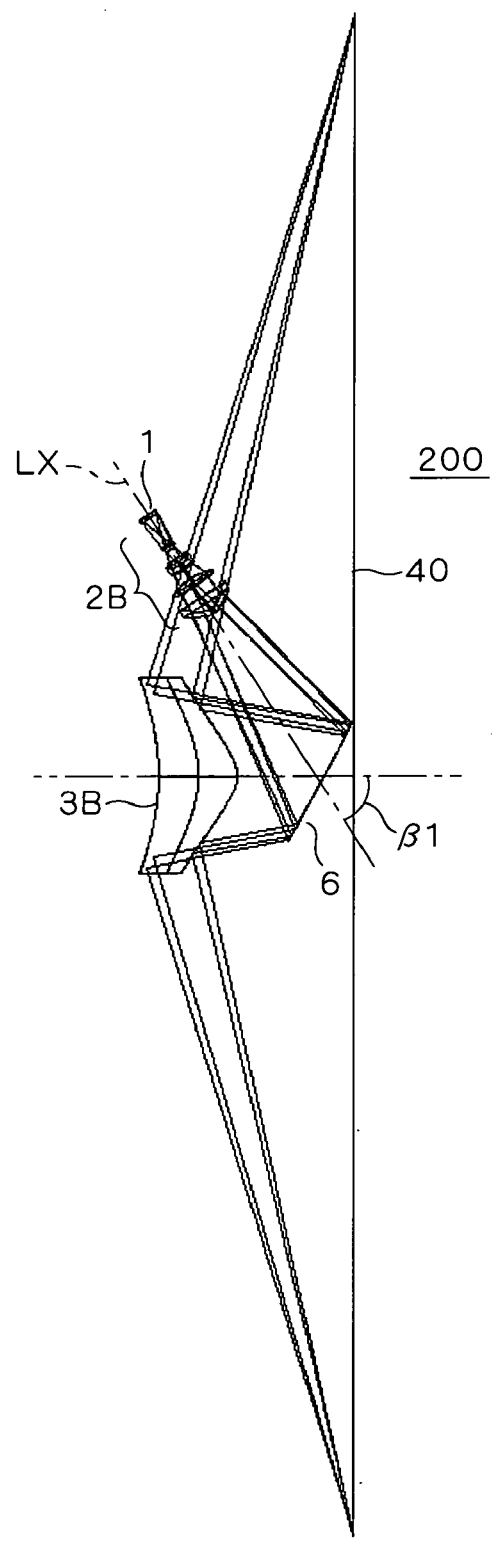
FIG. 16 A diagram showing the configuration and optical path of the image projector of the second preferred embodiment of the invention.

FIGS. 15 and 16 show the configuration and optical path of the image projector 200. The same components as those of the image projector 100 of FIGS. 9 and 10 are shown at the same reference characters and not described again here.

As shown in FIG. 15, the image projector 200 includes a reflecting light valve 1, a group of refracting lenses 2B forming a projecting optical system for enlarging and projecting an optical image given from the light valve 1, a power mirror 3B having a power and forming the projecting optical system together with the group of refracting lenses 2B, a transmissive screen 40 for displaying the optical image that is given from the light valve 1 and enlarged by the projecting optical system, and a plane mirror 6 having no power and positioned optically between the group of refracting lenses 2B and the power mirror 3B, for bending the optical axis LX in a horizontal plane. The center of the light valve 1 is offset vertically downward from the optical axis LX of the projecting optical system. In the image projector 200, the amount of offset of the light valve 1 is 7.2 mm.

FIG. 15 shows the configuration of the image projector 200 seen from the side (in a direction in which the screen extends laterally), where the power mirror 3B has a surface inclined with respect to the vertical direction of the screen 40 so that it can project the optical image in an enlarged manner vertically with respect to the screen 40.

FIG. 16 shows the configuration of the image projector 200 seen from above the screen 40, and the power mirror 3B has surfaces respectively inclined with respect to the lateral direction of the screen 40 so that it can project the optical image in an enlarged manner also laterally with respect to the screen 40.

In reality, the power mirror 3B is shaped to have rotational symmetry with respect to the optical axis LX, but FIGS. 15 and 16 show only the effective region upon which light impinges.

The group of refracting lenses 2B is placed on a side of the power mirror 3B in the horizontal direction, and the plane mirror 6 is disposed obliquely with respect to the inclined lateral surfaces of the power mirror 3B to bend the optical axis LX at an angle The power mirror 3B has a large negative power and designed to further enlarge the optical image given from the light valve 1 and enlarged by the group of refracting lenses 2B, and also to correct distortion. The power mirror 3B is aspherically shaped such that its curvature decreases toward the periphery, because the power mirror 3B would produce large positive distortion when shaped spherically.

Figure 17:
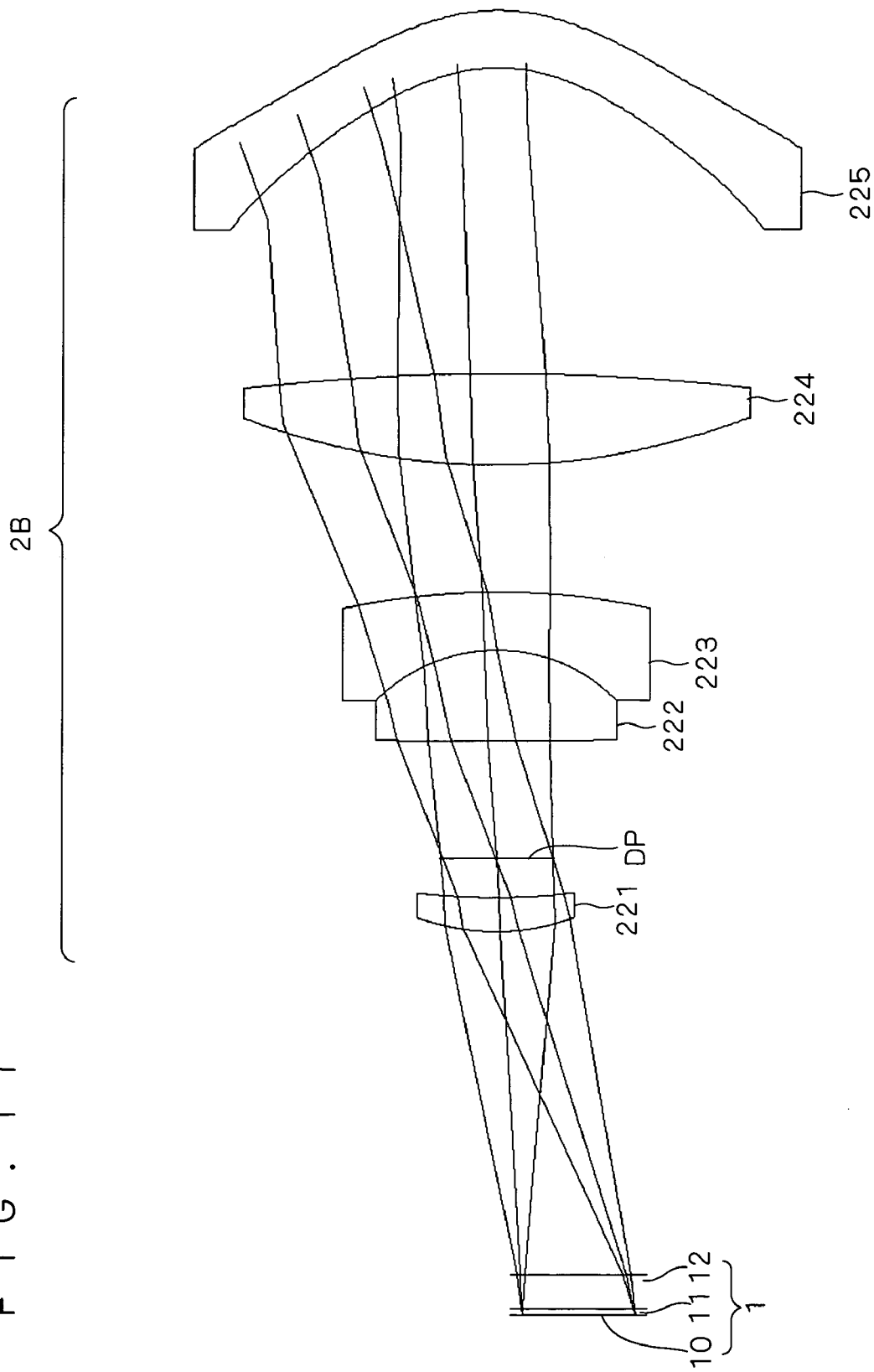
FIG. 17 A diagram showing the configuration of the lens system of the image projector of the second preferred embodiment of the invention.

FIG. 17 shows the configuration of the group of refracting lenses 2B. The group of refracting lenses 2B is formed of a combination of five lenses, from a lens 221 placed closest to the light valve 1 to a lens 225 placed most distant from the light valve 1. A diaphragm DP is provided between the lenses 221 and 222.

More specifically, the lens 221 is a meniscus lens convex-shaped on the reduction side, the lens 222 and the lens 223 form a cemented lens of a set of positive and negative lenses, the lens 224 is a positive lens having a larger curvature on the reduction side, and the lens 225 is a meniscus lens convex-shaped on the magnifying side. The surface of the lens 221 on the reduction side and both surfaces of the lens 225 are aspherical surfaces.

The positive lens 224 is added to the configuration of the group of refracting lenses 2A of the first preferred embodiment described with FIG. 11, whereby the power of the cemented lens is weakened.

In the image projector 200, the plane mirror 6 is positioned optically between the group of refracting lenses 2B and the power mirror 3B so that the plane mirror 6 bends the optical axis LX in a horizontal plane and projects the optical image onto the power mirror 3B, whereby the entire device can be structured thinner and the projecting optical system can be arranged more compactly.

Now, Tables 9 and 10 show an example of optical data for the image projector 200.

In Table 9, Surf indicates surface numbers S1 to S14 assigned sequentially to the surfaces of the individual components, with the surface of the mirror 10 of the light valve 1 (FIG. 17) shown as OBJ and the surface of the power mirror 3B shown as S14.

TABLE 9

| Surf | r | d | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 18.579 | 3.00 | 1.58913 | 61.25 |
| S4 | 56.862 | 3.40 | | |
| S5 (DIAPHRAGM) | ∞ | 10.40 | | |
| S6 | 1335.374 | 8.00 | 1.56732 | 42.84 |
| S7 | −14.523 | 5.00 | 1.80518 | 25.47 |
| S8 | −63.060 | 11.20 | | |
| S9 | 59.220 | 8.00 | 1.62004 | 36.30 |
| S10 | −191.693 | 26.80 | | |
| S11* | −15.165 | 5.00 | 1.52996 | 55.80 |
| S12* | −17.596 | 190.40 | | |
| S13 | ∞ | −80.00 | Mirror | |
| S14* | −37.197 | 109.09 | Mirror | |

Table 10 shows the conic coefficients and aspheric coefficients of the faces S3, S11, S12 and S14.

TABLE 10

| S3 | |
|---|---|
| k | −1.4531 |
| A4 | 7.4461456E−06 |
| A6 | 3.8680845E−08 |
| A8 | −3.3688736E−10 |
| S11 | |
| k | −1.050538 |
| A4 | 2.0740527E−05 |
| A6 | −1.7826132E−08 |
| A8 | 3.7401279E−12 |
| A10 | −1.6951982E−14 |
| S12 | |
| k | −1.033018 |
| A4 | 1.7695855E−05 |
| A6 | 1.0254696E−08 |
| A8 | −2.9413831E−11 |
| A10 | 1.2623878E−14 |
| S14 | |
| k | −4.327714 |
| A1 | −1.9747657E−01 |
| A3 | 7.5050122E−06 |
| A4 | −5.4414929E−08 |
| A5 | 2.9401440E−10 |
| A6 | −1.4181298E−12 |
| A7 | 4.9331413E−15 |
| A8 | −8.2378042E−18 |

In the image projector 200 having the optical system obtained on the basis of the optical data shown in Tables 9 and 10, the minimum angle of view θmin is 57.3°, and the corresponding value of the Petzval partial sum PL of the lenses is 0.02029 and shown as a numerical value D with O in FIG. 5 which shows the relation between the minimum angle of view θmin and the Petzval partial sum of lenses.

It is desirable that the angle β1 (°) at which the optical axis LX is bent as shown in FIG. 16 satisfy Expression (8) below.

$$46° \leq \beta 1 \leq 60° \quad (8)$$

In Expression (8) above, when the bending angle β1 is smaller than the lower limit, the power mirror 3B and the light rays traveling from the group of refracting lenses 2B to the plane mirror 6 interfere with each other. Also, the light valve 1 considerably protrudes beyond the power mirror 3B to the side opposite to the screen 40, and the depth dimension of the image projector 200 is increased.

Also, while the plane mirror 6 is disposed obliquely with respect to the inclined lateral surfaces of the power mirror 3B, setting the bending angle β1 larger than the upper limit causes the edge of the plane mirror 6 that is farther from the power mirror 3B to protrude beyond the position of the screen 40, in which case, too, the depth dimension of the image projector 200 is increased. Also, the edge of the plane mirror 6 that is closer to the power mirror 3B will interfere with the light rays traveling from the power mirror 3B toward the screen 40.

However, satisfying Expression (8) avoids the increase of the depth dimension of the image projector 200, and prevents interference between the components of the projecting optical system and light rays.

In the image projector 200 having the optical system obtained based on the optical data shown in Tables 9 and 10, the minimum angle of view θmin is 57.3° and the angle β1 at which the optical axis is bent is 56°.

Also, with the condition of Expression (8) satisfied, in order to arrange the plane mirror 6 without causing interference with light rays, it is desirable to lower the height of the light rays at the upper end of the optical image projected from the group of refracting lenses 2B to the power mirror 3B, so as to prevent interference between the upper end of the plane mirror 6 and the light rays at the lower end of the optical image projected from the power mirror 3B to the screen. Accordingly, the power mirror 3B is sized smaller than the power mirror 3A of the image projector 100 of the first preferred embodiment.

Also, in addition to these conditions, it is desirable to satisfy Expression (9) below as well.

$$0.4 < L1/L2 < 0.9 \quad (9)$$

Now, L1 and L2 will be explained referring to FIG. 18 that is an enlarged view of part of FIG. 16.

Figure 18:
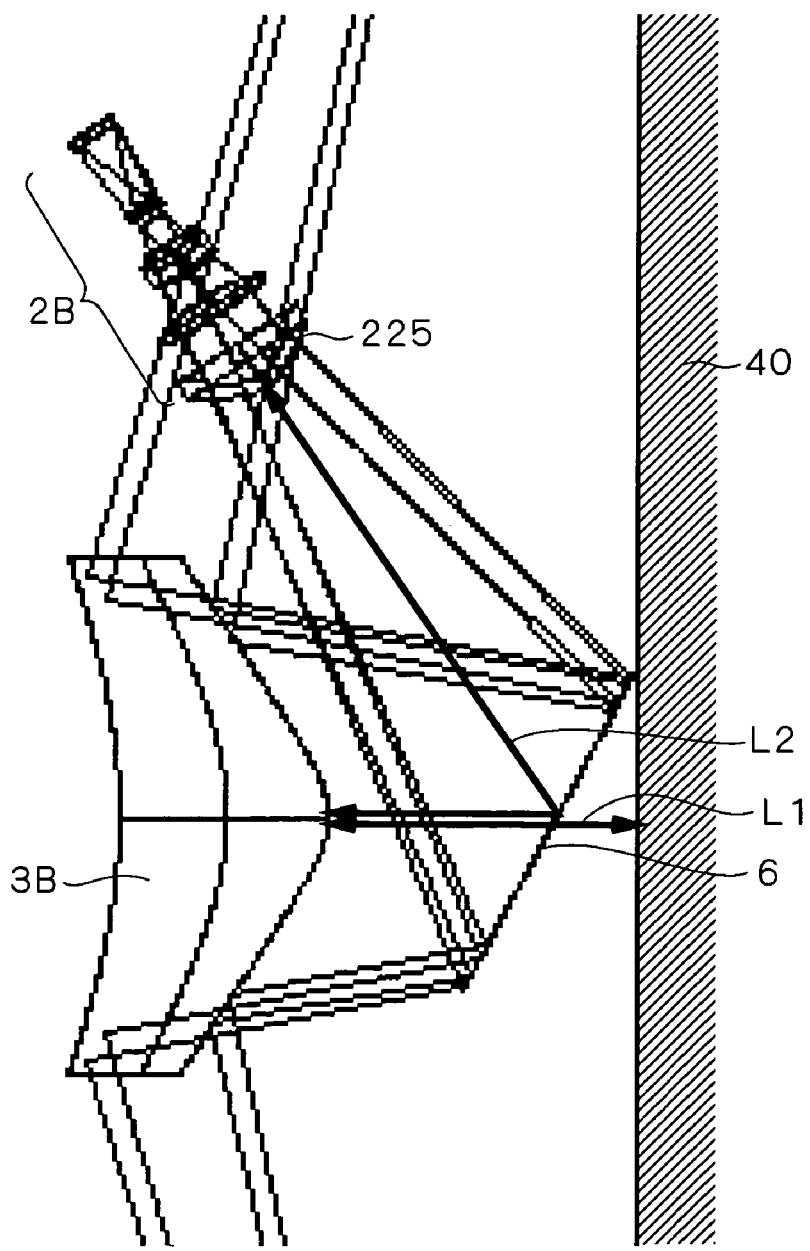
FIG. 18 An enlarged partial view of the image projector of the second preferred embodiment of the invention.

As shown in FIG. 18, L1 is a horizontal distance from the surface vertex of the power mirror 3B to a point right under the screen 40 (a horizontal distance from the surface vertex of the power mirror 3B to a position that would be defined when the screen 40 is imaginarily extended to a position facing the surface vertex of the power mirror 3B), and L2 is a distance along the optical axis between the surface vertex of the power mirror 3B and the surface vertex of the lens 225 placed closest to the screen in the group of refracting lenses 2B.

In Expression (9) above, when the value of L1/L2 is below the lower limit, the distance L1 is too small relative to the distance L2, and then bending the optical path will be difficult due to interference between the plane mirror 6 and light rays, and it will also be difficult to compactly arrange the components in the housing of the image projector 200.

When the value of L1/L2 is over the upper limit and the distance L1 is too large, the image projector 200 cannot be sized thin. When the distance L2 is too small, the power mirror 3B has to be sized smaller and the power of the lens system has to be made larger, which makes it difficult to correct distortion and astigmatism.

However, when Expression (9) is satisfied, the optical path can be bent without problems, the components can be easily accommodated compactly in the housing of the image projector 200, and the depth dimension of the image projector 200 is not sized larger. Also, it is not necessary to set a very large power for the lens system, and distortion and astigmatism can be corrected easily.

While the power mirror is sized smaller so that the components can be compactly accommodated in the housing, sizing the power mirror smaller offers the advantage below. That is, since the power mirror 3B is an aspherical surface having a large area, it is desirable, considering the productivity, to produce it by resin molding. In this case, molding a larger body involves larger manufacturing errors and increased manufacturing costs, due to factors such as shaping errors that are caused by non-uniform charge of resin into the mold, cooling time, shrinkage, and the like. Sizing the power mirror smaller solves these problems.

According to the image projector 200 of the second preferred embodiment described above, a plane mirror is provided in the projecting optical system in order to bend the optical axis in a horizontal plane, whereby the projecting optical system can be accommodated more compactly in the housing and the entire device can be structured thinner.

C. Third Preferred Embodiment

Now, referring to FIGS. 19 to 21, the configuration and operation of an image projector 300 according to a third preferred embodiment of the invention will be described.

Figure 19:
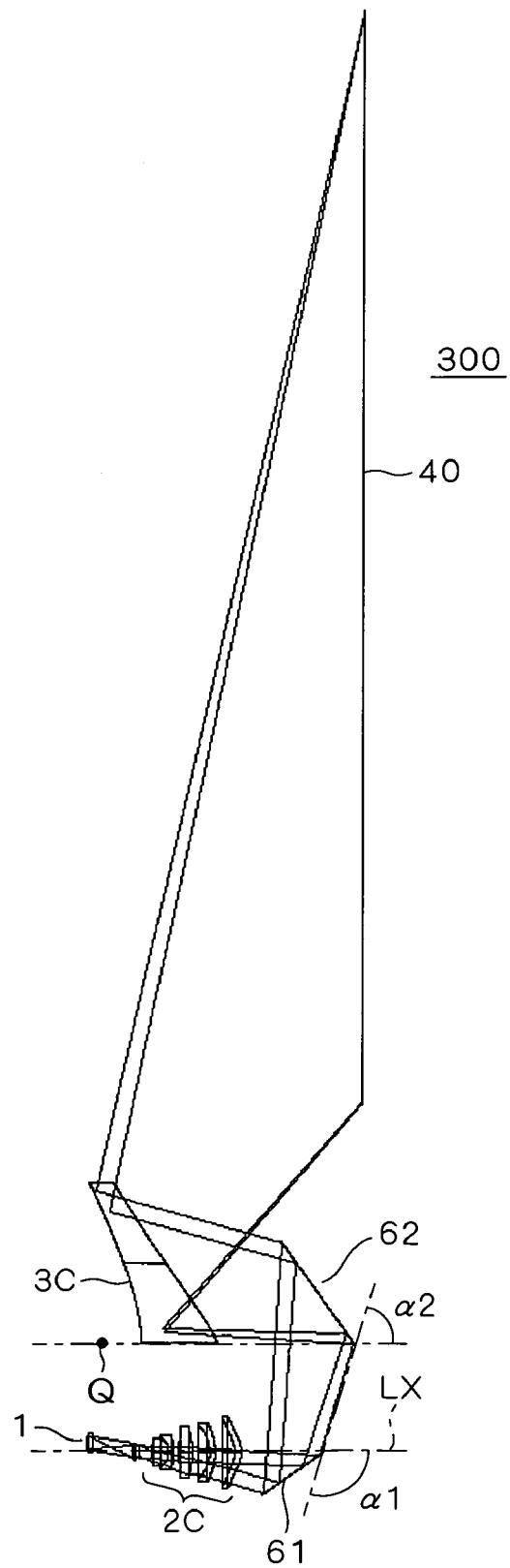
FIG. 19 A diagram showing the configuration and optical path of an image projector according to a third preferred embodiment of the present invention.
Figure 20:
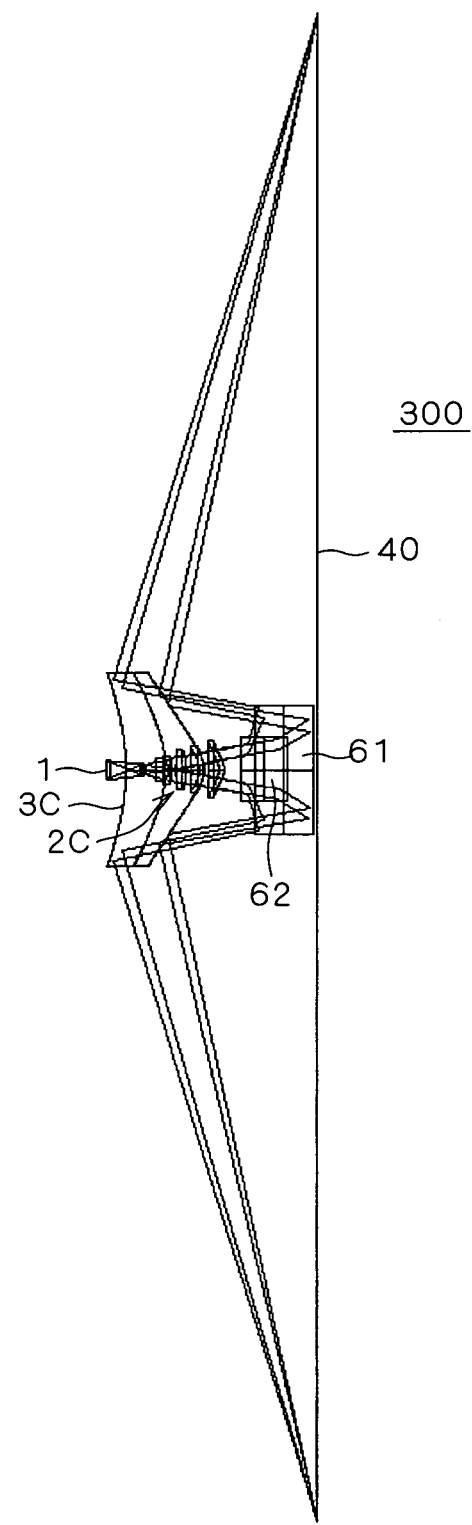
FIG. 20 A diagram showing the configuration and optical path of the image projector of the third preferred embodiment of the invention.

FIGS. 19 and 20 show the configuration and optical path of the image projector 300. The same components as those of the image projector 100 of FIGS. 9 and 10 are shown at the same reference characters and not described again here.

As shown in FIG. 19, the image projector 300 includes a reflecting light valve 1, a group of refracting lenses 2C forming a projecting optical system for enlarging and projecting an optical image given from the light valve 1, a power mirror 3C having a power and forming the projecting optical system together with the group of refracting lenses 2C, a transmissive screen 40 for displaying the optical image that is given from the light valve 1 and enlarged by the projecting optical system, and plane mirrors 61 and 62 (first and second plane mirrors) having no power and positioned optically between the group of refracting lenses 2C and the power mirror 3C, for bending the optical axis LX respectively in the vertical direction and the horizontal direction.

The center of the light valve 1 is offset vertically downward from the optical axis LX of the projecting optical system. In the image projector 300, the amount of offset of the light valve 1 is 7.2 mm.

FIG. 19 shows the configuration of the image projector 300 seen from the side (in a direction in which the screen extends laterally), where the power mirror 3C has a surface inclined with respect to the vertical direction of the screen 40 so that it can project the optical image in an enlarged manner vertically with respect to the screen 40.

FIG. 20 shows the configuration of the image projector 300 seen from above the screen 40, and the power mirror 3C has surfaces respectively inclined with respect to the lateral direction of the screen 40 so that it can project the optical image in an enlarged manner also laterally with respect to the screen 40.

In reality, the power mirror 3C is shaped to have rotational symmetry with respect to the optical axis LX, but FIGS. 19 and 20 show only the effective region upon which light impinges.

The group of refracting lenses 2C is positioned vertically under the power mirror 3C such that its optical axis LX is parallel to the normal to the screen surface. The plane mirrors 61 and 62 bend the optical axis LX by 180° in a vertical plane and project the optical image to the power mirror 3C.

The plane mirror 61 is disposed such that the light is reflected toward the screen 40, whereby the optical axis LX is bent at an angle α1 in the vertical direction.

The plane mirror 62 is disposed such that the reflected light is projected to the power mirror 3C, whereby the optical axis LX is bent at an angle α2 into the horizontal direction and the optical axis LX is thus made parallel to the normal to the screen surface again.

The power mirror 3C has a large negative power and designed to further enlarge the optical image given from the light valve 1 and enlarged by the group of refracting lenses 2C, and also to correct distortion. The power mirror 3C is aspherically shaped such that its curvature decreases toward the periphery, because the power mirror 3C would produce large positive distortion when shaped spherically.

Figure 21:
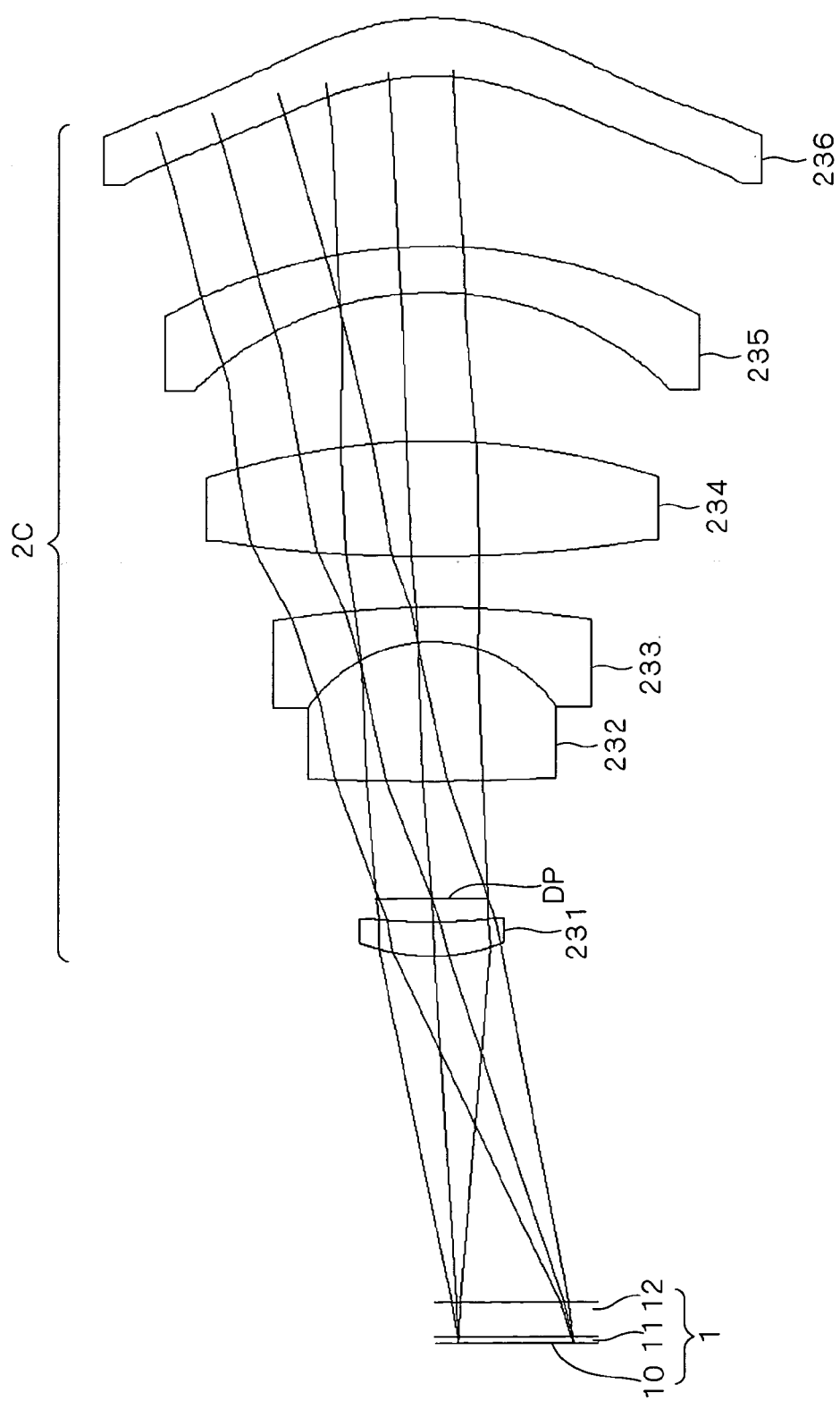
FIG. 21 A diagram showing the configuration of the lens system of the image projector of the third preferred embodiment of the invention.

FIG. 21 shows the configuration of the group of refracting lenses 2C. The group of refracting lenses 2C is formed of a combination of six lenses, from a lens 231 placed closest to the light valve 1 to a lens 236 placed most distant from the light valve 1. A diaphragm DP is provided between the lenses 231 and 232.

More specifically, the lens 231 is a meniscus lens convex-shaped on the reduction side, the lens 232 and the lens 233 form a cemented lens of a set of positive and negative lenses, the lens 234 is a bi-convex lens having a larger curvature on the magnifying side, and lenses 235 and 236 are meniscus lenses convex-shaped on the magnifying side. The surface of the lens 231 on the reduction side and both surfaces of the lens 236 are aspherical surfaces.

The negative lens 235 is added to the configuration of the group of refracting lenses 2B of the second preferred embodiment described with FIG. 17 to produce positive distortion, whereby the amount of correction of distortion of the lens 236 is made smaller.

In the image projector 300, the plane mirrors 61 and 62 are positioned optically between the group of refracting lenses 2C and the power mirror 3C so that the plane mirrors 61 and 62 bend the optical axis LX at 180° in a vertical plane and project the optical image onto the power mirror 3C, whereby the entire device can be structured thinner and the projecting optical system can be arranged more compactly.

Now, Tables 11 and 12 show an example of optical data for the image projector 300.

In Table 11, Surf indicates surface numbers S1 to S17 assigned sequentially to the surfaces of the individual components, with the surface of the mirror 10 of the light valve 1 (FIG. 21) shown as OBJ and the surface of the power mirror 3C shown as S17.

TABLE 11

| Surf | R | D | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 16.236 | 3.00 | 1.58913 | 61.25 |
| S4 | 47.224 | 2.00 | | |
| S5 (DIAPHRAGM) | ∞ | 10.20 | | |
| S6 | 196.144 | 12.00 | 1.56732 | 42.84 |
| S7 | −12.845 | 3.00 | 1.84666 | 23.78 |
| S8 | −83.837 | 4.40 | | |
| S9 | 121.540 | 10.00 | 1.80518 | 25.46 |
| S10 | −61.075 | 12.80 | | |
| S11 | −28.876 | 4.00 | 1.51680 | 64.20 |
| S12 | −46.373 | 14.80 | | |
| S13* | −20.294 | 5.00 | 1.52996 | 55.80 |

TABLE 11-continued

| Surf | R | D | nd | vd |
|---|---|---|---|---|
| S14* | −19.652 | 62.10 | | |
| S15 | ∞ | −80.00 | Mirror | |
| S16 | ∞ | 105.00 | Mirror | |
| S17* | 34.494 | −105.61 | Mirror | |

Table 12 shows the conic coefficients and aspheric coefficients of the aspherical surfaces S3, S13, S14 and S17.

TABLE 12

| S3 | |
|---|---|
| k | −0.3208115 |
| A4 | −1.8174673E−05 |
| A6 | 1.0076036E−07 |
| A8 | −1.6350344E−09 |
| S13 | |
| k | −0.7302895 |
| A4 | 3.1467879E−05 |
| A6 | −1.3492534E−08 |
| A8 | 1.7973746E−12 |
| A10 | −4.8649359E−15 |
| S14 | |
| k | −0.9440004 |
| A4 | 1.9814214E−05 |
| A6 | 1.2618505E−08 |
| A8 | −2.8650091E−11 |
| A10 | 9.6754177E−15 |
| S17 | |
| k | −4.366491 |
| A1 | 2.0344186E−01 |
| A3 | −8.4818522E−06 |
| A4 | 5.9396177E−08 |
| A5 | −2.5337269E−10 |
| A6 | 8.1209818E−13 |
| A7 | −2.1282225E−15 |
| A8 | 3.5156270E−18 |

In the image projector 300 having the optical system obtained on the basis of the optical data shown in Tables 11 and 12, the minimum angle of view θmin is 58.2°, and the corresponding value of the Petzval partial sum PL of lenses is 0.02186 and shown as a numerical value E with O in FIG. 5 which shows the relation between the minimum angle of view θmin and the Petzval partial sum of lenses.

It is desirable that the angle α1 (°) at which the optical axis LX is bent as shown in FIG. 19 satisfy Expression (10) below.

$$100° \leq \alpha1 \leq 140° \quad (10)$$

In Expression (10) above, when the bending angle α1 is smaller than the lower limit, the bending angle α2 becomes too large, and the light rays traveling from the power mirror 3C toward the screen 40 and the plane mirror 62 interfere with each other, and the lower edge of the plane mirror 62 protrudes beyond the position of the screen 40, resulting in an increase of the depth dimension of the image projector 300.

When the bending angle α1 is larger over the upper limit, the group of refracting lenses 2 and the plane mirror 61 interfere with each other.

In the image projector 300 having the optical system obtained based on the optical data shown in Tables 11 and 12, the minimum angle of view θmin is 58.2° and the angles α1 and α2 at which the optical axis is bent are 110° and 70°, respectively.

Also, in addition to these conditions, it is desirable to satisfy the Expression (9) described in the second preferred embodiment.

In this case, L1 is a horizontal distance from the surface vertex of the power mirror 3C to a position right under the screen 40 (a horizontal distance from the surface vertex of the power mirror 3C to a point that would be defined when the screen 40 is imaginarily extended to a position facing the surface vertex of the power mirror 3C), and L2 is a distance along the optical axis between the surface vertex of the power mirror 3C and the surface vertex of the lens 236 placed closest to the screen in the group of refracting lenses 2C.

However, when Expression (9) is satisfied, the optical path can be bent without problems, the components can be easily accommodated compactly in the housing of the image projector 300, and the depth dimension of the image projector 300 is not sized larger. Also, it is not necessary to set a very large power for the lens system, and distortion and astigmatism can be corrected easily.

According to the image projector 300 of the third preferred embodiment described above, two plane mirrors are provided in the projecting optical system in order to bend the optical axis at 180° in a vertical plane, whereby the projecting optical system can be accommodated more compactly in the housing and the entire device can be structured still thinner.

D. Fourth Preferred Embodiment

Now, referring to FIGS. 22 to 24, the configuration and operation of an image projector 400 according to a fourth preferred embodiment of the invention will be described.

Figure 22:
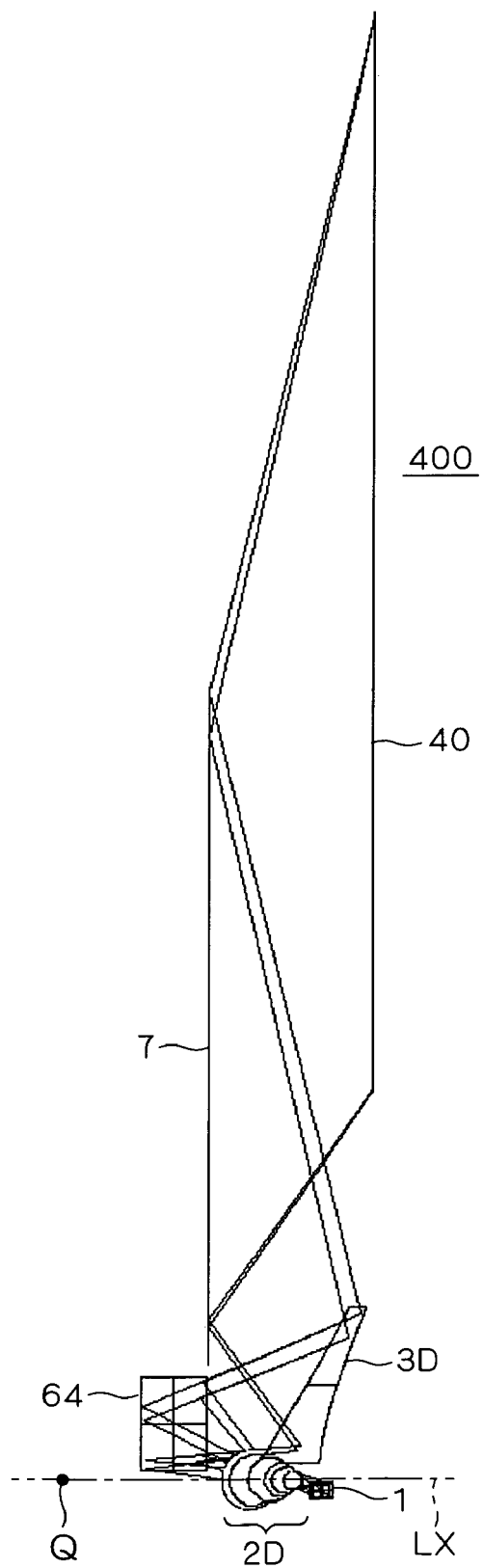
FIG. 22 A diagram showing the configuration and optical path of an image projector according to a fourth preferred embodiment of the present invention.
Figure 23:
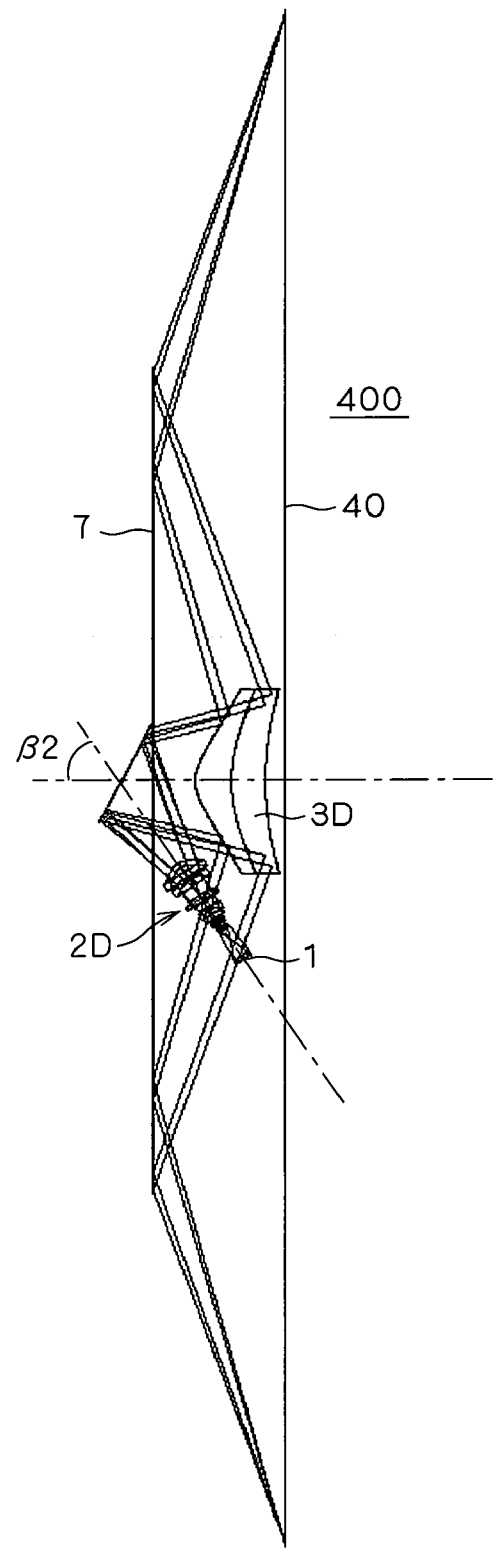
FIG. 23 A diagram showing the configuration and optical path of the image projector of the fourth preferred embodiment of the invention.

FIGS. 22 and 23 show the configuration and optical path of the image projector 400. The same components as those of the image projector 100 of FIGS. 9 and 10 are shown at the same reference characters and not described again here.

As shown in FIG. 22, the image projector 400 includes a reflecting light valve 1, a group of refracting lenses 2D forming a projecting optical system for enlarging and projecting an optical image given from the light valve 1, a power mirror 3D having a power and forming the projecting optical system together with the group of refracting lenses 2D, a transmissive screen 40 for displaying the optical image that is given from the light valve 1 and enlarged by the projecting optical system, a plane mirror 64 having no power and positioned optically between the group of refracting lenses 2D and the power mirror 3D, for bending the optical axis LX in a horizontal plane, and a rear mirror 7 positioned geometrically behind the screen 40 in parallel to the screen surface and optically between the power mirror 3D and the screen 40, for bending the optical axis LX at 180° in a vertical plane.

The center of the light valve 1 is offset vertically downward from the optical axis LX of the projecting optical system. In the image projector 400, the amount of offset of the light valve 1 is 8.5 mm.

FIG. 22 shows the configuration of the image projector 400 seen from the side (in a direction in which the screen extends laterally), where the power mirror 3D has a surface inclined with respect to the vertical direction of the rear mirror 7 so that it can project the optical image in an enlarged manner vertically with respect to the rear mirror 7.

FIG. 23 shows the configuration of the image projector 400 seen from above the screen 40, and the power mirror 3D has surfaces respectively inclined with respect to the lateral direction of the rear mirror 7 so that it can project the optical image in an enlarged manner also laterally with respect to the rear mirror 7.

In reality, the power mirror 3D is shaped to have rotational symmetry with respect to the optical axis LX, but FIGS. 22 and 23 show only the effective region upon which light impinges.

The group of refracting lenses 2D is placed on a side of the power mirror 3D in the horizontal direction, and positioned between the screen 40 and the rear mirror 7 if the screen 40 and the rear mirror 7 are imaginarily extended downward, and the plane mirror 64 is disposed obliquely with respect to the inclined lateral surfaces of the power mirror 3D to bend the optical axis LX at an angle β2.

The power mirror 3D has a large negative power and designed to further enlarge the optical image given from the light valve 1 and enlarged by the group of refracting lenses 2D, and also to correct distortion. The power mirror 3D is aspherically shaped such that its curvature decreases toward the periphery, because the power mirror 3D would produce large positive distortion when shaped spherically.

Figure 24:
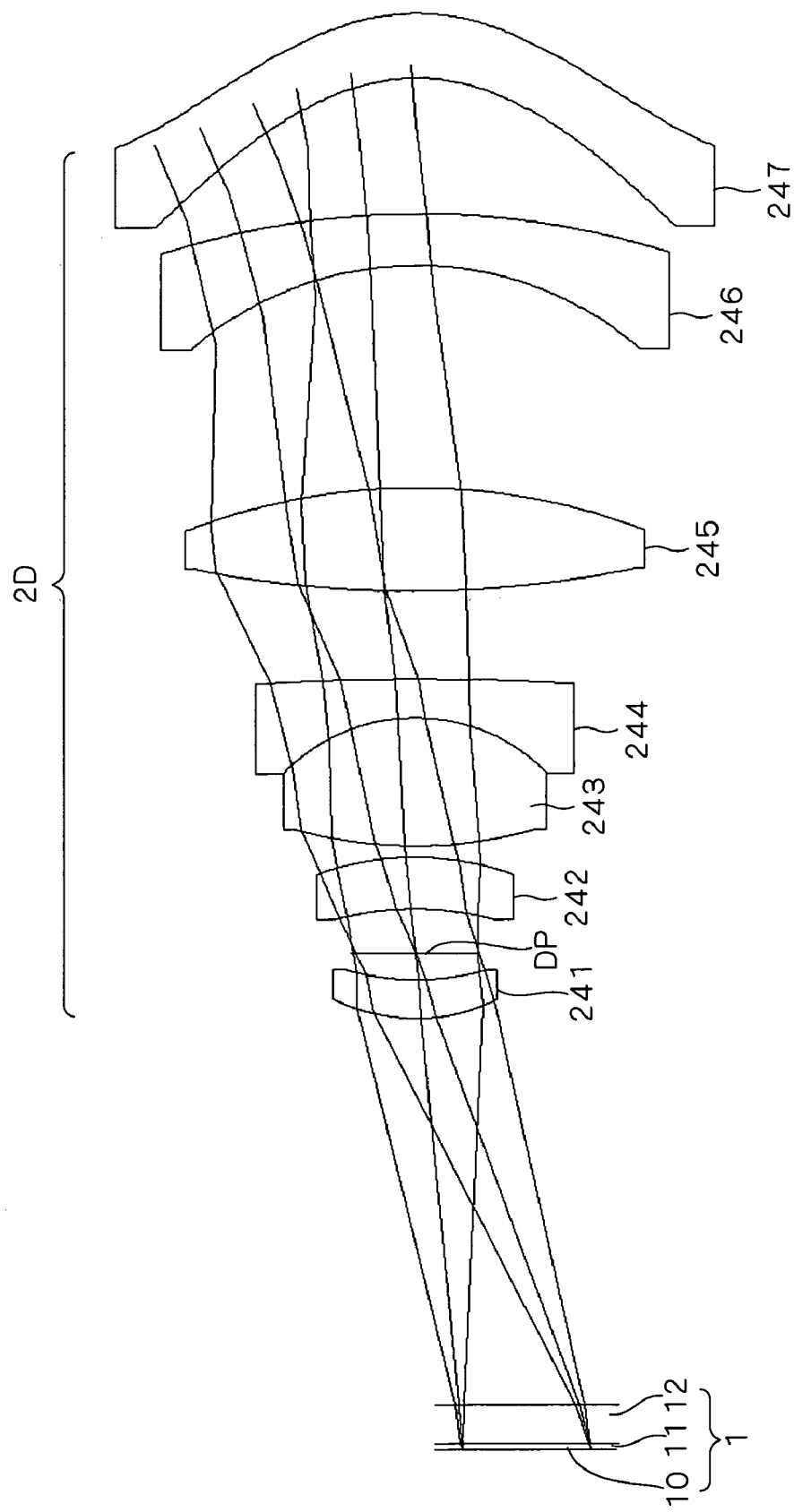
FIG. 24 A diagram showing the configuration of the lens system of the image projector of the fourth preferred embodiment of the invention.

FIG. 24 shows the configuration of the group of refracting lenses 2D. The group of refracting lenses 2D is formed of a combination of seven lenses, from a lens 241 placed closest to the light valve 1 to a lens 247 placed most distant from the light valve 1. A diaphragm DP is provided between the lenses 241 and 242.

More specifically, the lens 241 is a meniscus lens convex-shaped on the reduction side, the lens 242 is a meniscus lens convex-shaped on the magnifying side, the lens 243 and the lens 244 form a cemented lens of a set of positive and negative lenses, the lens 245 is a bi-convex lens having a larger curvature on the magnifying side, and the lenses 246 and 247 are meniscus lenses convex-shaped on the magnifying side. The surface of the lens 241 on the reduction side and both surfaces of the lens 247 are aspherical surfaces.

In the image projector 400, the amount of offset of the light valve 1 is 8.5 mm, which is larger than those in the devices of other preferred embodiments.

When the amount of offset is larger, the effective region of the power mirror 3D is separated from the optical axis LX. Accordingly, when the effective radius of the power mirror 3D from the optical axis LX remains equal while the amount of offset is enlarged, then the effective region of the power mirror 3D becomes smaller and it is equivalent to making the power mirror 3D smaller.

As a result, in the image projector 400, the maximum width of the effective region of the power mirror 3D is smaller by about 12 mm than that of the image projector 300 of the third preferred embodiment, and it is then difficult to correct distortion at the power mirror 3D. In order to compensate for this, the group of refracting lenses 2D has a constitution of adding an lens to the group of refracting lenses 2C to ensure performance of the optical system.

In the image projector 400, the plane mirror 64 is positioned optically between the group of refracting lenses 2D and the power mirror 3D so that the plane mirror 64 bends the optical axis LX in a horizontal plane and projects the optical image onto the power mirror 3D, and the rear mirror 7 is positioned optically between the power mirror 3D and the screen 40 to bend the optical axis at 180° and project the optical image onto the screen 40, whereby the device can be structured still thinner.

Now, in order to bend the optical path at the rear mirror 7, it is desirable that no interference occur between the rear mirror 7 and the light rays traveling from the plane mirror 64 to the power mirror 3D, and that the power mirror 3D not protrude outward beyond the screen 40.

Accordingly, in the image projector 400, the distance from the power mirror 3D to the screen 40 is set larger. However, setting a large distance from the power mirror 3D to the screen 40 reduces the angle of projection view, and so the amount of offset of the light valve 1 is set larger so that the angle of projection view is larger.

Now, Tables 13 and 14 show an example of optical data for the image projector 400.

In Table 13, Surf indicates surface numbers S1 to S19 assigned sequentially to the surfaces of the individual components, with the surface of the mirror 10 of the light valve 1 (FIG. 24) shown as OBJ and the surface of the rear mirror 7 shown as S19.

TABLE 13

| Surf | R | D | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 13.352 | 3.00 | 1.58913 | 61.25 |
| S4 | 18.593 | 2.00 | | |
| S5 (DIAPHRAGM) | ∞ | 3.50 | | |
| S6 | −22.509 | 4.00 | 1.48749 | 70.44 |
| S7 | −21.432 | 0.90 | | |
| S8 | 32.525 | 10.00 | 1.53172 | 48.84 |
| S9 | −13.933 | 3.00 | 1.84666 | 23.78 |
| S10 | −191.124 | 6.80 | | |
| S11 | 82.249 | 8.00 | 1.80518 | 25.46 |
| S12 | −48.223 | 17.20 | | |
| S13 | −25.953 | 4.00 | 1.59270 | 35.45 |
| S14 | −63.496 | 10.50 | | |
| S15* | −14.714 | 5.00 | 1.52996 | 55.80 |
| S16* | −16.443 | 96.00 | | |
| S17 | ∞ | −65.00 | Mirror | |
| S18* | −40.402 | 35.00 | Mirror | |
| S19 | ∞ | −125.00 | Mirror | |

Table 14 shows the conic coefficients and aspheric coefficients of the aspherical surfaces S3, S15, S16 and S18.

TABLE 14

| S3 | |
|---|---|
| k | −0.7633542 |
| A4 | 6.6869160E−06 |
| A6 | 1.6580415E−07 |
| A8 | −1.4584568E−09 |
| S15 | |
| k | −0.9208507 |
| A4 | 1.6771200E−05 |
| A6 | 1.0012674E−09 |
| A8 | −4.8245533E−11 |
| A10 | 9.6984265E−14 |
| S16 | |
| k | −1.005362 |
| A4 | 1.3727526E−05 |
| A6 | 3.0652802E−08 |
| A8 | −4.9453087E−11 |
| A10 | 2.8323800E−14 |
| S18 | |
| k | −4.90215 |
| A1 | −1.8534329E−01 |
| A3 | 1.2719377E−05 |
| A4 | −9.8951611E−08 |
| A5 | 3.4196028E−10 |
| A6 | 3.0507041E−14 |
| A7 | −4.0444145E−15 |
| A8 | 9.0947799E−18 |

In the image projector 400 having the optical system obtained on the basis of the optical data shown in Tables 13 and 14, the minimum angle of view θmin is 59.8°, and the corresponding value of the Petzval partial sum PL of the lenses is 0.01736 and shown as a numerical value F with O in FIG. 5 which shows the relation between the minimum angle of view θmin and the Petzval partial sum of lenses.

It is desirable that the angle β2 (°) at which the optical axis LX is bent as shown in FIG. 23 satisfy Expression (11) below.

$$46° \leq β2 \leq 90° \tag{11}$$

In Expression (11) above, when the bending angle β2 is smaller than the lower limit, interference occurs between the group of refracting lenses 2D and the power mirror 3D.

On the other hand, when the bending angle β2 is larger than the upper limit, the plane mirror 64 must be sized larger and the group of refracting lenses 2D or the light valve 1 is separated far from the screen 40, and the device cannot be structured thin.

In the image projector 400 having the optical system obtained based on the optical data shown in Tables 13 and 14, the minimum angle of view θmin is 59.8° and the angle β2 at which the optical axis is bent is 56°.

Also, in addition to these conditions, it is desirable to satisfy Expression (12) below as well.

$$θ/ω<1 \tag{12}$$

Where, θ is a difference between maximum and minimum values of the angle formed between the optical axis LX and the group of principal rays emitted from the power mirror 3D, and ω is a difference between maximum and minimum values of the angle formed between the optical axis LX and the group of principal rays emitted from the group of refracting lenses 2D, which is determined by the designed values of the group of refracting lenses 2D.

When Expression (12) is not satisfied and θ is too large, the range of the angle of projection view on the screen 40 becomes too large and interference may occur between the rear mirror 7 and the light rays between the plane mirror 64 and the power mirror 3D. When ω is small, the effective region of the power mirror 3D is small, and it may be difficult to effectively correct aberrations such as distortion and astigmatism at the power mirror 3D, or interference may be caused between the rear mirror 7 and the light rays between the plane mirror 64 and the power mirror 3D.

However, when the condition of Expression (12) is satisfied, the optical path can be bent without causing interference between the rear mirror 7 and the light rays between the plane mirror 64 and the power mirror 3D, and distortion and astigmatism can be effectively corrected at the power mirror 3D.

According to the image projector 400 of the fourth preferred embodiment described above, the plane mirror 64 is positioned optically between the group of refracting lenses 2D and the power mirror 3D so that the plane mirror 64 bends the optical axis LX in a horizontal plane, and the rear mirror 7 is positioned optically between the power mirror 3D and the screen 40 to bend the optical axis at 180° and project the optical image onto the screen 40, which enables the entire device to be structured further thinner.

E. Fifth Preferred Embodiment

Now, referring to FIGS. 25 and 26, the configuration and operation of an image projector 500 according to a fifth preferred embodiment of the invention will be described.

FIGS. 25 and 26 show the configuration and optical path of the image projector 500. The same components as those of the image projector 100 of FIGS. 9 and 10 are shown at the same reference characters and not described again here.

As shown in FIG. 25, the image projector 500 includes a reflecting light valve 1, a group of refracting lenses 2D forming a projecting optical system for enlarging and projecting an optical image given from the light valve 1, a power mirror 3E having a power and forming the projecting optical system together with the group of refracting lenses 2D, a transmissive screen 40 for displaying the optical image that is given from the light valve 1 and enlarged by the projecting optical system, a plane mirror 65 having no power and positioned optically between the group of refracting lenses 2D and the power mirror 3E, for bending the optical axis LX in a vertical plane, and a rear mirror 71 positioned geometrically behind the screen 40 in parallel with the screen surface and optically between the power mirror 3E and the screen 40, for bending the optical axis LX at 180° in a vertical plane.

The center of the light valve 1 is offset vertically downward from the optical axis LX of the projecting optical system. In the image projector 500, the amount of offset of the light valve 1 is 8.5 mm.

FIG. 25 shows the configuration of the image projector 500 seen from the side (in a direction in which the screen extends laterally), where the power mirror 3E has a surface inclined with respect to the vertical direction of the rear mirror 71 so that it can project the optical image in an enlarged manner vertically with respect to the rear mirror 71.

FIG. 26 shows the configuration of the image projector 500 seen from above the screen 40, and the power mirror 3E has surfaces respectively inclined with respect to the lateral direction of the rear mirror 71 so that it can project the optical image in an enlarged manner also laterally with respect to the rear mirror 71.

In reality, the power mirror 3E is shaped to have rotational symmetry with respect to the optical axis LX, but FIGS. 25 and 26 show only the effective region upon which light impinges.

The group of refracting lenses 2D is positioned vertically under the power mirror 3E such that the optical axis LX has a tilt with respect to the normal to the screen surface, and the group of refracting lenses 2D is positioned between the screen 40 and the rear mirror 71 when the screen 40 and the rear mirror 71 are imaginarily extended downward, and the plane mirror 65 is positioned such that the reflected light is projected to the power mirror 3E, and the optical axis LX is bent at an angle α3 in a vertical plane to become parallel to the normal to the screen surface.

The power mirror 3E has a large negative power and designed to further enlarge the optical image given from the light valve 1 and enlarged by the group of refracting lenses 2D, and also to correct distortion. The power mirror 3E is aspherically shaped such that its curvature decreases toward the periphery, because the power mirror 3E would produce large positive distortion when shaped spherically.

The group of refracting lenses 2D is structured as shown in FIG. 24 and its configuration is not described here again.

In the image projector 500, the group of refracting lenses 2D is positioned vertically under the power mirror 3E, the plane mirror 65 is positioned optically between the group of refracting lenses 2D and the power mirror 3E so that the plane mirror 65 bends the optical axis LX in a vertical plane and projects the optical image onto the power mirror 3E, and the rear mirror 71 is positioned optically between the power mirror 3E and the screen 40 so that the optical axis is bent at 180° and the optical image is projected onto the screen 40, whereby the protrusion of the plane mirror 65 beyond the rear mirror 71 is reduced to allow the device to be structured still thinner.

Now, Tables 15 and 16 show an example of optical data for the image projector 500.

In Table 15, Surf indicates surface numbers S1 to S19 assigned sequentially to the surfaces of the individual components, with the surface of the mirror 10 of the light valve 1 (FIG. 24) shown as OBJ and the surface of the rear mirror 71 shown as S19.

TABLE 15

| Surf | r | d | nd | vd |
|---|---|---|---|---|
| OBJ | ∞ | 0.44 | | |
| S1 | ∞ | 3.00 | 1.48640 | 66.63 |
| S2 | ∞ | 30.00 | | |
| S3* | 13.352 | 3.00 | 1.58913 | 61.25 |
| S4 | 18.593 | 2.00 | | |
| S5 (DIAPHRAGM) | ∞ | 3.50 | | |
| S6 | −22.509 | 4.00 | 1.48749 | 70.44 |
| S7 | −21.432 | 0.90 | | |
| S8 | 32.525 | 10.00 | 1.53172 | 48.84 |
| S9 | −13.933 | 3.00 | 1.84666 | 23.78 |
| S10 | −191.124 | 6.80 | | |
| S11 | 82.249 | 8.00 | 1.80518 | 25.46 |
| S12 | −48.223 | 17.20 | | |
| S13 | −25.953 | 4.00 | 1.59270 | 35.45 |
| S14 | −63.496 | 10.50 | | |
| S15* | −14.714 | 5.00 | 1.52996 | 55.80 |
| S16* | −16.443 | 91.00 | | |
| S17 | ∞ | −70.00 | Mirror | |
| S18* | −40.402 | 35.00 | Mirror | |
| S19 | ∞ | −125.00 | Mirror | |

Table 16 shows the conic coefficients and aspheric coefficients of the aspherical surfaces S3, S15, S16 and S18.

TABLE 16

| S3 | |
|---|---|
| k | −0.7633542 |
| A4 | 6.6869160E−06 |
| A6 | 1.6580415E−07 |
| A8 | −1.4584568E−09 |
| S15 | |
| k | −0.9208507 |
| A4 | 1.6771200E−05 |
| A6 | 1.0012674E−09 |
| A8 | −4.8245533E−11 |
| A10 | 9.6984265E−14 |
| S16 | |
| k | −1.005362 |
| A4 | 1.3727526E−05 |
| A6 | 3.0652802E−08 |
| A8 | −4.9453087E−11 |
| A10 | 2.8323800E−14 |
| S18 | |
| k | −4.90215 |
| A1 | −1.8534329E−01 |
| A3 | 1.2719377E−05 |
| A4 | −9.8951611E−08 |
| A5 | 3.4196028E−10 |
| A6 | 3.0507041E−14 |
| A7 | −4.0444145E−15 |
| A8 | 9.0947799E−18 |

In the image projector 500 having the optical system obtained on the basis of the optical data shown in Tables 15 and 16, the minimum angle of view θmin is 59.8°, and the corresponding value of the Petzval partial sum PL of the lenses is 0.01736 and shown as the numerical value F with O (the same value as that of the fourth preferred embodiment) in FIG. 5 which shows the relation between the minimum angle of view θmin and the Petzval partial sum of lenses.

It is desirable that the angle α3 (°) at which the optical axis LX is bent as shown in FIG. 25 satisfy Expression (13) below.

$$40° \leq \alpha 3 \leq 50° \qquad (13)$$

In Expression (13) above, when the bending angle α3 is smaller than the lower limit, the light valve 1 will protrude beyond the screen 40 to the side opposite to the rear mirror 71. Or, interference will occur between the power mirror 3E and light rays traveling from the group of refracting lenses 2D to the plane mirror 65.

When the bending angle α3 is larger over the upper limit, the plane mirror 65 has to be sized larger and the depth dimension of the device is increased. The height dimension of the device is also increased.

In the image projector 500 having the optical system obtained based on the optical data shown in Tables 15 and 16, the minimum angle of view θmin is 59.8° and the angle a3 at which the optical axis is bent is 46°.

Also, in addition to these conditions, it is desirable to satisfy the Expression (12) described in the fourth preferred embodiment.

When the condition of Expression (12) is satisfied, the optical path can be bent without causing interference between the rear mirror 71 and the light rays between the plane mirror 65 and the power mirror 3E, and distortion and astigmatism can be effectively corrected at the power mirror 3E.

According to the image projector 500 of the fifth preferred embodiment described above, the group of refracting lenses 2D is positioned vertically under the power mirror 3E, and the optical axis LX is bent by the plane mirror 65 in a vertical plane, whereby the plane mirror 65 can be sized smaller than the plane mirror 64 described in the fourth preferred embodiment, and the protrusion of the plane mirror 65 beyond the rear mirror 71 can be reduced to allow the entire device to be structured still thinner.

<Modifications>

In the fourth and fifth preferred embodiments described above, the plane mirrors 64 and 65 protrude away from the screen 40 respectively beyond the rear mirrors 7 and 71, but this arrangement is shown by way of illustration and not of limitation. For example, a larger distance may be set between the power mirror 3D or 3E and the screen 40, or the power mirror 3D or 3E may be sized smaller, so that the plane mirror 64 or 65 does not protrude.

Also, the description above has shown examples in which the group of refracting lenses and the power mirror of the projecting optical system form an axially symmetrical system with a common optical axis, but the invention is not limited to the examples. Part or entirety of the group of refracting lenses, or the power mirror, or the screen, or some of them, may be decentered. Part of the group of refracting lenses or the power mirror may be formed as free-form surface.

The image projector of the invention has been described as of rear-projection type having a transmissive screen, but, of course, it can be of front-projection type.

Also, regardless of whether it is of rear-projection type or front-projection type, image projectors produced according to the invention may be combined in an array to form a multiple screen.

While the invention has been described in detail, the foregoing description is in all aspects illustrative and not restrictive. It is understood that numerous other modifications and variations can be devised without departing from the scope of the invention.

The invention claimed is:

1. An image projector comprising:
   a reflecting light valve that displays an optical image;
   a projecting optical system that enlarges and projects said optical image given from said light valve; and a screen onto which said optical image enlarged by said projecting optical system is projected, said projecting optical system comprising:

a group of refracting lenses that receives and enlarges light from said light valve; and a power mirror that has a power and that receives, and enlarges and reflects light from said group of refracting lenses, wherein a display surface of said light valve and a screen surface of said screen are disposed perpendicular to an optical axis, and wherein, when a minimum value of an angle formed between a normal to said screen surface and principal rays incident upon said screen is a minimum angle of view $\theta$min, and, about said group of refracting lenses, a radius of curvature of an ith surface is $r_i$, a refractive index of said ith surface is $n_i$, a refractive index of an (i+1)th surface is $n_{i+1}$, and a total number of lens surfaces is N, and a sum of Petzval components of the surfaces of the plurality of lenses of said group of refracting lenses is a Petzval partial sum of the lenses, PL, and $$PL = \Sigma\{-1/r_i \times (1/n_{i+1} - 1/n_i)\} \ [i=1, \ldots, N],$$

then, in said projecting optical system, an exit pupil position is set such that said minimum angle of view $\theta$min exceeds 40°, and a relation of PL>0.0007× $\theta$min−0.026 is satisfied.

2. The image projector according to claim 1, wherein the optical image enlarged by said projecting optical system is projected directly from said power mirror onto said screen.

3. The image projector according to claim 1, wherein said group of refracting lenses is positioned on a side of said power mirror in a horizontal direction, said projecting optical system further comprises a plane mirror that is positioned optically between said group of refracting lenses and said power mirror, said plane mirror having no power and bending said optical axis toward said power mirror in a horizontal plane, and said plane mirror is disposed to bend said optical axis at an angle ±1 that satisfies a condition expressed by Expression below $$46° \leq \beta1 \leq 60°.$$

4. The image projector according to claim 3, wherein, when a horizontal distance from a surface vertex of said power mirror to a position right under said screen is L1, and a distance along said optical axis between the surface vertex of said power mirror and a surface vertex of a lens placed closest to said screen in said group of refracting lenses is L2, then, said projecting optical system is disposed to satisfy a condition expressed by Expression below $$0.4 < L1/L2 < 0.9.$$

5. The image projector according to claim 1, wherein said group of refracting lenses is positioned vertically under said power mirror such that said optical axis is parallel to the normal to said screen surface, said projecting optical system comprises first and second plane mirrors that are positioned optically between said group of refracting lenses and said power mirror, said first and second plane mirrors having no power and bending said optical axis respectively at an angle α1 and an angle α2 in a vertical direction and a horizontal direction so as to bend said optical axis at 180° in a vertical plane, and said first plane mirror is disposed such that said angle α1 at which said optical axis is bent satisfies a condition expressed by Expression below $$100° \leq \alpha1 \leq 140°.$$

6. The image projector according to claim 5, wherein, when a horizontal distance from a surface vertex of said power mirror to a position right under said screen is L1, and a distance along said optical axis between the surface vertex of said power mirror and a surface vertex of a lens placed closest to said screen in said group of refracting lenses is L2, then, said projecting optical system is disposed to satisfy a condition expressed by Expression below $$0.4 < L1/L2 < 0.9.$$

7. The image projector according to claim 1, wherein said projecting optical system comprises:

a plane mirror that is positioned optically between said group of refracting lenses and said power mirror, said plane mirror having no power and bending said optical axis in a horizontal plane; and a rear mirror that is positioned geometrically behind said screen in parallel with said screen surface, and optically between said power mirror and said screen, said rear mirror bending said optical axis at 180° in a vertical plane, and wherein said group of refracting lenses is positioned on a side of said power mirror in a horizontal direction, and positioned between said screen and said rear mirror when said screen and said rear mirror are imaginarily extended downward, and said plane mirror is disposed to bend said optical axis at an angle β2 that satisfies a condition expressed by Expression below $$46° \leq \beta2 \leq 90°.$$

8. The image projector according to claim 7, wherein, when a difference between a maximum value and a minimum value of an angle formed between said optical axis and a group of principal rays emitted from said power mirror is θ, and a difference between a maximum value and a minimum value of an angle formed between said optical axis and a group of principal rays emitted from said group of refracting lenses is ω, then, said θ and said ω satisfy a relation expressed by Expression below $$\theta/\omega < 1.$$

9. The image projector according to claim 1, wherein said projecting optical system comprises:

a plane mirror that is positioned optically between said group of refracting lenses and said power mirror, said plane mirror having no power and bending said optical axis in a vertical plane; and a rear mirror that is positioned geometrically behind said screen in parallel with said screen surface, and optically between said power mirror and said screen, said rear mirror bending said optical axis at 180° in a vertical plane, and wherein said group of refracting lenses is positioned vertically under said power mirror such that said optical axis has a tilt with respect to the normal to the screen surface, and positioned between said screen and said rear mirror when said screen and said rear mirror are imaginarily extended downward, and said plane mirror is disposed to bend said optical axis at an angle α3 that satisfies a condition expressed by Expression below $40° \leq \alpha 3 \leq 50°.$

10. The image projector according to claim 9, wherein, when a difference between a maximum value and a minimum value of an angle formed between said optical axis and a group of principal rays emitted from said power mirror is θ, and a difference between a maximum value and a minimum value of an angle formed between said optical axis and a group of principal rays emitted from said group of refracting lenses is ω, then, said θ and said ω satisfy a relation expressed by Expression below $\theta/\omega < 1.$

11. The image projector according to claim 1, wherein said light valve has its center offset vertically downward from said optical axis of said projecting optical system.

12. The image projector according to claim 1, wherein said screen is a transmissive screen formed of a total-reflecting Fresnel lens.

* * * * *